US012807508B2

(12) United States Patent
Braida

(10) Patent No.: US 12,807,508 B2
(45) Date of Patent: Nov. 24, 2026

(54) LITHIUM RARE-EARTH HALIDES

(71) Applicant: SYENSQO SA, Brussels (BE)

(72) Inventor: Marc-David Braida, Bry-sur-Marne (FR)

(73) Assignee: SYENSQO SA, Brussels (BE)

(*) Notice: Subject to any disclaimer, the term of this patent is extended or adjusted under 35 U.S.C. 154(b) by 953 days.

(21) Appl. No.: 17/996,303

(22) PCT Filed: Apr. 12, 2021

(86) PCT No.: PCT/EP2021/059427

§ 371 (c)(1),
(2) Date: Oct. 14, 2022

(87) PCT Pub. No.: WO2021/209380

PCT Pub. Date: Oct. 21, 2021

(65) Prior Publication Data

US 2023/0212024 A1 Jul. 6, 2023

(30) Foreign Application Priority Data

Apr. 14, 2020 (EP) .................................... 20169464
Apr. 14, 2020 (EP) .................................... 20169467

(51) Int. Cl.

| | |
|---|---|
| ***H01M 4/62*** | (2006.01) |
| ***C01F 17/36*** | (2020.01) |
| ***C01G 25/00*** | (2006.01) |
| ***C01G 27/00*** | (2006.01) |
| ***H01M 10/052*** | (2010.01) |
| ***H01M 10/0525*** | (2010.01) |
| ***H01M 10/0562*** | (2010.01) |
| ***H01M 10/52*** | (2006.01) |

(52) U.S. Cl.

CPC ......... *C01G 25/006* (2013.01); *C01G 27/006* (2013.01); *H01M 4/62* (2013.01); *H01M 10/052* (2013.01); *H01M 10/0562* (2013.01); *C01P 2002/72* (2013.01); *C01P 2004/61* (2013.01); *C01P 2004/62* (2013.01); *C01P 2006/40* (2013.01); *H01M 2300/008* (2013.01)

(58) Field of Classification Search

CPC .. H01M 4/62; H01M 10/052; H01M 10/0562; H01M 10/62; H01M 2300/008; H01M 2220/20; H01M 10/0525; C01G 25/006; C01G 27/006; C01P 2002/72; C01P 2004/61; C01P 2004/62; C01P 2006/40; C01P 2004/64; Y02E 60/10; C01F 17/36

USPC .......................................................... 423/263

See application file for complete search history.

(56) References Cited

U.S. PATENT DOCUMENTS

| | | | | |
|---|---|---|---|---|
| 5,672,437 | A * | 9/1997 | Yajima | H01M 8/1246 427/126.3 |
| 8,449,790 | B2 * | 5/2013 | Narula | H01M 10/052 429/189 |
| 9,190,697 | B2 * | 11/2015 | Narula | H01M 10/052 |
| 9,490,500 | B2 * | 11/2016 | Shin | C04B 35/486 |
| 11,489,195 | B2 * | 11/2022 | Sakai | H01M 10/052 |
| 2020/0328453 | A1 * | 10/2020 | Sakai | H01M 10/0562 |
| 2022/0216507 | A1 * | 7/2022 | Sun | C03C 10/16 |

FOREIGN PATENT DOCUMENTS

| | | | | |
|---|---|---|---|---|
| WO | WO-2019135320 A1 * | 7/2019 | | C01G 29/006 |
| WO | WO-2019135348 A1 * | 7/2019 | | C01G 25/006 |

OTHER PUBLICATIONS

Combes C M et al.: Optical and scintillation properties of pure and Ce3+ doped Cs2LiYCl6 and Li3YCl6:Ce3+ crystals, Journal of Luminescence, vol. 82, Sep. 16, 1999 (Sep. 16, 1999), pp. 299-305.*

* cited by examiner

*Primary Examiner* — Cam N. Nguyen

(74) *Attorney, Agent, or Firm* — Osha Bergman Watanabe & Burton LLP

(57) ABSTRACT

The present invention concerns new lithium rare earth halides that may be used as solid electrolytes or in electrochemical devices. The invention also refers to wet and dry processes for the synthesis of such lithium rare earth halides and lithium rare earth halides susceptible to be obtained by these processes.

19 Claims, 4 Drawing Sheets

LITHIUM RARE-EARTH HALIDES

Figure 1:
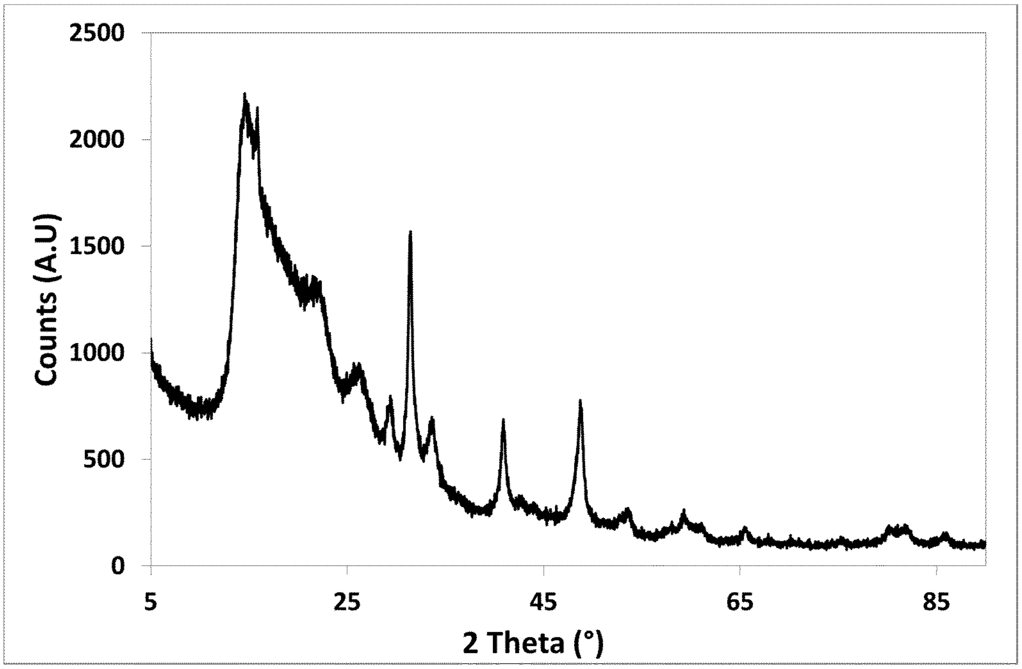

This application is a national stage entry of PCT/EP2021/059427, which claims priorities filed on 14 Apr. 2020 in EUROPE with Nr 20169464.3 and Nr 20169467.6, the whole content of each of these applications being incorporated herein by reference for all purposes.

The present invention concerns new lithium rare-earth halides that may be used as solid electrolytes or in electrochemical devices. The invention also refers to wet and dry processes for the synthesis of such lithium rare-earth halides and lithium rare-earth halides susceptible to be obtained by these processes.

PRIOR ART

Lithium batteries are used to power portable electronics and electric vehicles owing to their high energy and power density. Conventional lithium batteries make use of a liquid electrolyte that is composed of a lithium salt dissolved in an organic solvent. The aforementioned system raises security questions as the organic solvents are flammable. Lithium dendrites forming and passing through the liquid electrolyte medium can cause short circuit and produce heat, which result in accident that leads to serious injuries. Since the electrolyte solution is a flammable liquid, there is a concern of occurrence of leakage, ignition or the like when used in a battery. Taking such concern into consideration, development of a solid electrolyte having a higher degree of safety is expected as an electrolyte for a next-generation lithium battery.

Non-flammable inorganic solid electrolytes offer a solution to the security problem. Furthermore, their mechanic stability helps suppressing lithium dendrite formation, preventing self-discharge and heating problems, and prolonging the life-time of a battery.

Glass and glass ceramic electrolytes are advantageous for lithium battery applications due to their high ionic conductivities and mechanical properties. These electrolytes can be pelletized and attached to electrode materials by cold pressing, which eliminates the necessity of a high temperature assembly step. Elimination of the high temperature sintering step removes one of the challenges against using lithium metal anodes in lithium batteries. Due to the wide-spread use of all solid state lithium batteries, there is an increasing demand for solid state electrolytes having a high conductivity for lithium ions.

Recently the rare-earth halide $Li_3YCl_6$ produced by dry mechanosynthesis has been reported to exhibit an enhanced oxidative stability to high potentials, notably in comparison with thiophosphate-based electrolytes. However, there is a need to still improve the ionic conductivity.

There is hence a need for new solid electrolytes having optimized performances, such as higher ionic conductivity and lower activation energy, without compromising other important properties like chemical and mechanical stability.

INVENTION

Surprisingly it has been found that new solid lithium rare-earth halides having higher ionic conductivity and lower activation energy in comparison with usual $Li_3YCl_6$ materials may be obtained by using at least two rare-earth metals. The new LiREX solid materials of the invention also exhibit at least similar chemical and mechanical stability and processability as conventional lithium halides. Solid materials of the invention may also be prepared with improved productivity and allowing a control of the morphology of the obtained product. Furthermore it appears that rare-earth metal materials, notably used as raw materials for the production of lithium rare-earth halides are less costly than usual rare-earth halide materials with better scalability.

The present invention refers then to a solid material according to general formula (I) as follows:

$$Li_{6-3x-4y}RE_xT_yX_6 \quad (I)$$

wherein:

X is a halogen selected from the group consisting of F, Cl, I and Br;

$0<x+(4/3)\,y<2$; preferably $0.8\leq x+(4/3)\leq 1.5$; more preferably $0.95\leq x+(4/3)y\leq 1.25$;

$0\leq y\leq 0.8$; preferably $0.1\leq y\leq 0.7$; more preferably $0.25\leq y\leq 0.6$;

RE denotes two or more rare-earth metals; the rare-earth metals are different from each other; and T is Zr or Hf;

with the proviso that when y=0 and RE denotes two rare-earth metals then, when one rare-earth metal is Y, the other one is selected from the group consisting of Gd, Yb, Ho, Er, Dy, Ce, Tb and Nd.

The invention also concerns a method for producing a solid material according to general formula (I) as follows:

$$Li_{6-3x-4y}RE_xT_yX_6 \quad (I)$$

wherein X, x, y, RE and T are as above defined;

comprising reacting at least a lithium halide, at least two different rare-earth metal halides, in such halides the rare-earth metals are different from each other and optionally zirconium or hafnium halide; optionally in one or more solvents.

The invention also refers to a process for the preparation of a solid material according to general formula (I) as follows:

$$Li_{6-3x-4y}RE_xT_yX_6 \quad (I)$$

wherein X, x, y, RE and T are as above defined;

said process comprising the steps of:

a) obtaining a composition by admixing stoichiometric amounts of a lithium halide, at least two different rare-earth metal halides, in such halides the rare-earth metals are different from each other and optionally zirconium or hafnium halide, optionally in one or more solvents, under an inert atmosphere;

b) applying a mechanical treatment to the composition obtained in step a) in order to obtain the solid material; and c) optionally removing at least a portion of the one or more solvents from the composition obtained on step b), so that to obtain the solid material.

The invention furthermore concerns a solid material susceptible to be obtained by said process.

The invention also refers to the use of a solid material of formula (I) as follows:

$$Li_{6-3x-4y}RE_xT_yX_6 \quad (I)$$

wherein X, x, y, RE and T are as above defined;

as solid electrolyte.

The invention also refers to a solid electrolyte comprising at least a solid material of formula (I) as follows:

$$Li_{6-3x-4y}RE_xT_yX_6 \quad (I)$$

wherein X, x, y, RE and T are as above defined.

The invention also concerns an electrochemical device comprising at least a solid electrolyte comprising at least a solid material of formula (I) as follows:

$$Li_{6-3x-4y}RE_xT_yX_6 \quad (I)$$

wherein X, x, y, RE and T are as above defined.

The invention also refers to a solid state battery comprising at least a solid electrolyte comprising at least a solid material of formula (I) as follows:

$$Li_{6-3x-4y}RE_xT_yX_6 \quad (I)$$

wherein X, x, y, RE and T are as above defined.

The present invention also concerns a vehicle comprising at least a solid state battery comprising at least a solid electrolyte comprising at least a solid material of formula (I) as follows:

$$Li_{6-3x-4y}RE_xT_yX_6 \quad (I)$$

wherein X, x, y, RE and T are as above defined.

Surprisingly, it has also been found that a new process for the production of solid lithium rare-earth halides permits to increase their ionic conductivity and lower activation energy in comparison with usual processes. The new LiREX solid materials of the invention also exhibit at least similar chemical and mechanical stability and processability like those conventional lithium halides. Solid materials of the invention may also be prepared with improved productivity and allowing a control of the morphology of the obtained product.

The present invention also refers then to a process for the preparation of solid material according to general formula (I) as follows:

$$Li_{6-3x-4y}RE_xT_yX_6 \quad (I)$$

wherein:

X is a halogen;

$0<x+(4/3)y<2$; preferably $0.8\leq x+(4/3)y\leq 1.5$; more preferably $0.95\leq x+(4/3)y\leq 1.25$;

$0\leq y\leq 0.8$; preferably $0.1\leq y\leq 0.7$; more preferably $0.25\leq y\leq 0.6$;

RE denotes one or more rare-earth metals; the rare-earth metals are different from each other; and T is Zr or Hf;

said process comprising the steps of:

a) obtaining a composition by admixing stoichiometric amounts of a lithium halide, at least a rare-earth metal halide and optionally zirconium or hafnium halide, in one or more solvents, under an inert atmosphere;

b) applying a mechanical treatment to the composition obtained in step a) in order to obtain the solid material; and c) removing at least a portion of the one or more solvents from the composition obtained on step b), so that to obtain the solid material.

The invention furthermore concerns a solid material susceptible to be obtained by said process.

Finally, the invention also refers to the use of a solid material as previously described as solid electrolyte. The invention also refers to a solid electrolyte comprising at least a solid material as previously described. The invention also concerns an electrochemical device comprising at least a solid electrolyte comprising at least a solid material as previously described. The invention also refers to a solid state battery comprising at least a solid electrolyte comprising at least a solid material as previously described. The present invention also concerns a vehicle comprising at least a solid state battery comprising at least a solid electrolyte comprising at least a solid material as previously described.

Definitions

Throughout this specification, unless the context requires otherwise, the word "comprise" or "include", or variations such as "comprises", "comprising", "includes", including" will be understood to imply the inclusion of a stated element or method step or group of elements or method steps, but not the exclusion of any other element or method step or group of elements or method steps. According to preferred embodiments, the word "comprise" and "include", and their variations mean "consist exclusively of".

As used in this specification, the singular forms "a", "an" and "the" include plural aspects unless the context clearly dictates otherwise. The term "and/or" includes the meanings "and", "or" and also all the other possible combinations of the elements connected to this term.

The term "between" should be understood as being inclusive of the limits.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a temperature range of about 120° C. to about 150° C. should be interpreted to include not only the explicitly recited limits of about 120° C. to about 150° C., but also to include sub-ranges, such as 125° C. to 145° C., 130° C. to 150° C., and so forth, as well as individual amounts, including fractional amounts, within the specified ranges, such as 122.2° C., 140.6° C., and 141.3° C., for example.

The term "electrolyte" refers in particular to a material that allows ions, e.g., $Li^+$, to migrate therethrough but which does not allow electrons to conduct therethrough. Electrolytes are useful for electrically isolating the cathode and anodes of a battery while allowing ions, e.g., $Li^+$, to transmit through the electrolyte. The "solid electrolyte" according to the present invention means in particular any kind of material in which ions, for example, $Li^+$, can move around while the material is in a solid state.

As used herein, the term "crystalline phase" refers to a material of a fraction of a material that exhibits a crystalline property, for example, well-defined x-ray diffraction peaks as measured by X-Ray Diffraction (XRD).

As used herein, the term "peaks" refers to (2Θ) positions on the x-axis of an XRD powder pattern of intensity v. degrees (2Θ) which have a peak intensity substantially greater than the background. In a series of XRD powder pattern peaks, the primary peak is the peak of highest intensity which is associated with the compound, or phase, being analyzed. The second primary peak is the peak of second highest intensity. The third primary peak is the peak of third highest intensity.

The term "electrochemical device" refers in particular to a device which generates and/or stores electrical energy by, for example, electrochemical and/or electrostatic processes. Electrochemical devices may include electrochemical cells such as batteries, notably solid state batteries. A battery may be a primary (i.e., single or "disposable" use) battery, or a secondary (i.e., rechargeable) battery.

As used herein, the terms "cathode" and "anode" refer to the electrodes of a battery. During a charge cycle in a Li-secondary battery, Li ions leave the cathode and move through an electrolyte and to the anode. During a charge cycle, electrons leave the cathode and move through an external circuit to the anode. During a discharge cycle in a Li-secondary battery, Li ions migrate towards the cathode through an electrolyte and from the anode. During a discharge cycle, electrons leave the anode and move through an external circuit to the cathode.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more different sources of power, for example both gasoline-powered and electric-powered vehicles.

DETAILED INVENTION

The invention relates to a solid material of formula (I) as follows:

$$Li_{6-3x-4y}RE_xT_yX_6 \quad (I)$$

wherein:

X is a halogen;

$0<x+(4/3)y<2$; preferably $0.8\leq x+(4/3)y\leq 1.5$; more preferably $0.95\leq x+(4/3)y\leq 1.25$;

$0\leq y\leq 0.8$; preferably $0.1\leq y\leq 0.7$; more preferably $0.2\leq y\leq 0.6$;

RE denotes two or more rare-earth metals; the rare-earth metals are different from each other; and T is Zr or Hf;

with the proviso that when y=0 and RE denotes two rare-earth metals, then when one is Y, the other one is selected from the group consisting of Gd, Yb, Ho, Er, Dy, Ce, Tb and Nd.

In a first embodiment of the invention, y=0 and the solid material is of formula (Ia)

$$Li_{6-3x}RE_xX_6 \quad (Ia)$$

wherein:

X is a halogen;

$0<x<2$; preferably $0.8\leq x\leq 1.5$; more preferably $0.95\leq x\leq 1.25$; and RE denotes two or more rare-earth metals; the rare-earth metals are different from each other; with the proviso that when RE denotes two rare-earth metals, when one is Y, the other one is selected from the group consisting of Gd, Yb, Ho, Er, Dy, Ce, Tb and Nd.

The solid material of the invention is neutrally charged. It is understood that formula (I)/(Ia) is an empirical formula (gross formula) determined by means of elemental analysis. Accordingly, formula (I) defines a composition which is averaged over all phases present in the solid material.

The 17 rare-earth elements are cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), and yttrium (Y).

X is a halogen selected from the group consisting of F, Cl, I and Br, X is preferably Cl or Br.

In Formula (Ia): $0<x<2$; preferably $0.8\leq x\leq 1.5$; more preferably $0.95\leq x\leq 1.25$. Particularly x is 0.1, 0.2, 0.3, 0.4, 0.5, 0.6, 0.7, 0.8, 0.9, 1, 1.1, 1.1, 1.3, 1.4 and 1.5 or any range made from these values.

The solid material of the invention may be amorphous (glass) and/or crystallized (glass ceramics). Only part of the solid material may be crystallized. The crystallized part of the solid material may comprise only one crystal structure or may comprise a plurality of crystal structures. The content of amorphous and crystalline constituents in the solid material could be evaluated using a whole powder pattern fitting (WPPF) technique with an $Al_2O_3$ crystal, which is a typical reference material, as described in "RSC Adv., 2019, 9, 14465". Solid material of the invention preferably comprises a fraction consisting of glass phases.

The composition of the compound of formula (I)/(Ia) may notably be determined by chemical analysis using techniques well known to the skilled person, such as for instance a X-Ray Diffraction (XRD) and an Inductively Coupled Plasma-Mass Spectrometry (ICP-MS).

Preferably the mean ionic radius of RE, ie. the average ionic radius values of the rare-earth metals, exhibits an ionic radius value (in Å) lower than 0.938 Å. Each of the rare-earth metal composing RE (for instance RE1 and RE2) does not have to fulfill this condition. Mean radius can be define as the arithmetical mean of the radii of the rare-earth ($RE^{3+}$ in 6-fold coordination number) in the compound. For instance according to the invention mean radius may be equal to:

0.904 Å wherein RE1 is Y (90% mol) and RE2 is Gd (10% mol);

0.895 Å wherein RE1 is Y (50% mol) and RE2 is Er (50% mol);

The solid material of the invention may have formula (II) as follows:

$$Li_{6-3x-4y}RE1_aRE2_bT_yX_6 \quad (II)$$

wherein:

X is a halogen;

$0<x+(4/3)y<2$; preferably $0.8\leq x+(4/3)y\leq 1.5$; more preferably $0.95\leq x+(4/3)y\leq 1.25$;

$0\leq y\leq 0.8$; preferably $0.1\leq y\leq 0.7$; more preferably $0.2\leq y\leq 0.6$;

$a+b=x$, with $0.05\leq a\leq 0.95$ and $0.0<b\leq 0.95$; preferably $0.5\leq a\leq 0.9$ and $0.05<b\leq 0.5$;

RE1 is selected from the group consisting of: Y, Yb, Ho, Er;

RE2 is selected from the group consisting of: Yb, Ho, Gd, Er, Sm, Dy, La, Nd, Ce, Tb; where RE1 and RE2 are different; and T is Zr or Hf, with the proviso that when y=0 and RE1 is Y, RE2 is selected from the group consisting of Gd, Yb, Ho, Er, Dy, Ce, Tb and Nd.

When y=0, the solid material has formula (IIa) as follows:

$$Li_{6-3x}RE1_aRE2_bX_6 \quad (IIa)$$

wherein:

X is a halogen;

$0<x<2$; preferably $0.8\leq x\leq 1.5$; more preferably $0.95\leq x\leq 1.25$;

$a+b=x$, with $0.05\leq a\leq 0.95$ and $0.0\leq b\leq 0.95$; preferably $0.5\leq a\leq 0.9$ and $0.05<b\leq 0.5$;

RE1 is selected from the group consisting of: Y, Yb, Ho, and Er; and

RE2 is selected from the group consisting of: Gd, Y, Yb, Ho, Er, Sm, Dy, Ce, Tb, La, and Nd; with RE1 different from RE2;

with the proviso that when RE1 is Y, RE2 is selected from the group consisting of Gd, Yb, Ho, Er, Dy, Ce, Tb and Nd.

Preferably the mean ionic radius of RE, ie. the average ionic radius values of the rare-earth metals RE1 and RE2, exhibits an ionic radius value (in A) lower than 0.938 Å.

Preferably solid materials of formula (II)/(IIa) according to the present invention may be as follows:

| x | X | RE1 | a | RE2 | b | Mean Rare-earth Ionic Radius (Å) |
|---|---|---|---|---|---|---|
| 1 | Cl | Y | 0.9 | Gd | 0.1 | 0.904 |
| 1.1 | Cl | Y | 1 | Gd | 0.1 | 0.903 |
| 1 | Cl | Y | 0.5 | Er | 0.5 | 0.895 |

Solid material may also be a compound of formula (III) as follows:

$$Li_{6-3x-4y}RE1_aRE2_bRE3_cT_yX_6 \quad (III)$$

wherein:

X is a halogen;

$0<x+(4/3)y<2$; preferably $0.8\leq x+(4/3)y\leq 1.5$; more preferably $0.95\leq x+(4/3)y\leq 1.25$;

$0\leq y\leq 0.8$; preferably $0.1\leq y\leq 0.7$; more preferably $0.2\leq y\leq 0.6$;

$a+b+c=x$, with $0.05\leq a\leq 0.95$, $0.0<b\leq 0.95$ and $0.0<c\leq 0.95$ with $0.05\leq b+c$;

RE1 is selected from the group consisting of: Y, Yb, Ho, Er;

RE2 is selected from the group consisting of: Yb, Ho, Gd, Er, Sm, Dy, La, Nd, Ce, Tb;

RE3 is selected from the group consisting of: Ho, Gd, Er, Sm, Dy La, Nd, Ce, Tb;

where RE1, RE2 and RE3 are different; and

T is Zr or Hf.

When y=0, the solid material is a compound of formula (IIIa) as follows:

$$Li_{6-3x}RE1_aRE2_bRE3_cX_6 \quad (IIIa)$$

wherein:

X is a halogen;

$0<x<2$; preferably $0.85\leq x\leq 1.5$; more preferably $0.95\leq x\leq 1.25$;

$a+b+c=x$, with $0.05\leq a\leq 0.95$, $0.0<b\leq 0.95$ and $0.0<c\leq 0.95$ with $0.05\leq b+c$;

RE1 is selected from the group consisting of: Y, Yb, Ho, Er;

RE2 is selected from the group consisting of: Yb, Ho, Gd, Er, Sm, Dy, La, Nd, Ce, Tb; and RE3 is selected from the group consisting of: Ho, Gd, Er, Sm, Dy, La, Nd Ce, Tb; where RE1, RE2 and RE3 are different.

Preferably the mean ionic radius of RE, ie. the average ionic radius values of the rare-earth metals RE1, RE2 and RE3, exhibits an ionic radius value (in A) lower than 0.938 Å.

Preferably solid materials of formula (III)/(IIIa) according to the present invention may be as follows:

| x | X | RE1 | a | RE2 | b | RE3 | c | Mean Rare-earth Ionic Radius (Å) |
|---|---|---|---|---|---|---|---|---|
| 1 | Cl | Y | 0.45 | Er | 0.45 | Gd | 0.1 | 0.899 |
| 1 | Cl | Y | 0.45 | Er | 0.45 | La | 0.1 | 0.909 |

Solid material of the invention may also be a compound of formula (IV) as follows:

$$Li_{6-3x-4y}RE1_aRE2_bRE3_cRE4_dT_yX_6 \quad (IV)$$

wherein:

- X is a halogen;
- $0<x+(4/3)y<2$; preferably $0.8\leq x+(4/3)y\leq 1.5$; more preferably $0.95\leq x+(4/3)y\leq 1.25$;
- $0\leq y\leq 0.8$; preferably $0.1\leq y\leq 0.7$; more preferably $0.2\leq y\leq 0.6$;
- $a+b+c+d=x$, with $0.05\leq a\leq 0.95$, $0.0<b\leq 0.95$, $0.0<c\leq 0.95$ and $0.0<d\leq 0.95$ with $0.05\leq b+c+d$;
- RE1 is selected from the group consisting of: Y, Yb, Ho, Er;
- RE2 is selected from the group consisting of: Yb, Ho, Gd, Er, Sm, Dy, La, Nd, Ce, Tb;
- RE3 is selected from the group consisting of: Ho, Gd, Er, Sm, Dy La, Nd, Ce, Tb;
- RE4 is selected from the group consisting of: Er, Gd Sm, Dy La, Nd, Ce, Tb; where RE1, RE2, RE3 and RE4 are different; and
- T is Zr or Hf.

When y=0, the solid material is a compound of formula (IVa) as follows:

$$Li_{6-3x}RE1_aRE2_bRE3_cRE4_dX_6 \quad (IVa)$$

wherein

- X is a halogen;
- $0<x<2$; preferably $0.8\leq x\leq 1.5$; more preferably $0.95\leq x\leq 1.25$;
- $a+b+c+d=x$, with $0.05\leq a\leq 0.95$, $0.0<b\leq 0.95$, $0.0<c\leq 0.95$ and $0.0<d\leq 0.95$ with $0.05\leq b+c+d$;
- RE1 is selected from the group consisting of: Y, Yb, Ho, Er;
- RE2 is selected from the group consisting of: Yb, Ho, Gd, Er, Sm, Dy, La, Nd, Ce, Tb;
- RE3 is selected from the group consisting of: Ho, Gd, Er, Sm, Dy, La, Nd, Ce, Tb; and
- RE4 is selected from the group consisting of: Gd, Er, Sm, Dy La, Nd, Ce, Tb; where RE1, RE2, R3 and RE4 are different.

Preferably the mean ionic radius of RE, ie. the average ionic radius values of the rare-earth metals RE1, RE2, RE3 and RE4, exhibits an ionic radius value (in Å) lower than 0.938 Å.

Preferably solid materials of formula (IV)/(IVa) according to the present invention may be as follows:

| x | X | RE1 | a | RE2 | b | RE3 | c | RE4 | d | Mean Rare-earth Ionic Radius (Å) |
|---|---|---|---|---|---|---|---|---|---|---|
| 1 | Cl | Y | 0.3 | Yb | 0.3 | Er | 0.3 | Gd | 0.1 | 0.891 |
| 1.1 | Cl | Y | 0.3 | Yb | 0.3 | Er | 0.3 | La | 0.2 | 0.912 |
| 1 | Cl | Y | 0.25 | Yb | 0.25 | Ho | 0.25 | Er | 0.25 | 0.889 |

Solid material of the invention may also be a compound of formula (V) as follows:

$$Li_{6-3x-4y}RE1_aRE2_bRE3_cRE4_dRE5_eT_yX_6 \quad (V)$$

wherein:

- X is a halogen,
- $0<x+(4/3)y<2$; preferably $0.8\leq x+(4/3)y\leq 1.5$; more preferably $0.95\leq x+(4/3)y\leq 1.25$;
- $0\leq y\leq 0.8$; preferably $0.1\leq y\leq 0.7$; more preferably $0.2\leq y\leq 0.6$;
- $a+b+c+d+e=x$, with $0.05\leq a\leq 0.95$, $0.0<b\leq 0.95$, $0.0<c\leq 0.95$, $0.0<d\leq 0.95$ and $0.0<e\leq 0.95$, with $0.05\leq b+c+d+e$;
- RE1 is selected from the group consisting of: Y, Yb, Ho, Er;
- RE2 is selected from the group consisting of: Yb, Ho, Gd, Er, Sm, Dy, La, Nd, Ce, Tb;
- RE3 is selected from the group consisting of: Ho, Gd, Er, Sm, Dy La, Nd, Ce, Tb;
- RE4 is selected from the group consisting of: Er, Gd Sm, Dy La, Nd, Ce, Tb; and
- RE5 is selected from the group consisting of: Gd Sm, Dy La, Nd, Ce, Tb; where RE1, RE2, RE3, RE4 and RE5 are different; and
- T is Zr or Hf.

When y=0, the solid material is a compound of formula (Va) as follows:

$$Li_{6-3x}RE1_aRE2_bRE3_cRE4_dRE5_eX_6 \quad (Va)$$

wherein

- X is a halogen;
- $0<x<2$; preferably $0.8\leq x\leq 1.5$; more preferably $0.95\leq x\leq 1.25$;
- $a+b+c+d+e=x$, with $0.05\leq a\leq 0.95$, $0.0<b\leq 0.95$, $0.0<c\leq 0.95$, $0.0<d\leq 0.95$ and $0.0<e\leq 0.95$, with $0.05\leq b+c+d+e$;
- RE1 is selected from the group consisting of: Y, Yb, Ho, Er;
- RE2 is selected from the group consisting of: Yb, Ho, Gd, Er, Sm, Dy, La, Nd, Ce, Tb;
- RE3 is selected from the group consisting of: Ho, Gd, Er, Sm, Dy La, Nd, Ce, Tb;
- RE4 is selected from the group consisting of: Er, Gd Sm, Dy La, Nd, Ce, Tb; and
- RE5 is selected from the group consisting of: Gd Sm, Dy La, Nd, Ce, Tb; where RE1, RE2, R3, R4 and RE5 are different.

Preferably the mean ionic radius of RE, ie. the average ionic radius values of the rare-earth metals RE1, RE2, RE3, RE4 and RE5, exhibits an ionic radius value (in Å) lower than 0.938 Å.

Preferably solid materials of formula (V)/(Va) according to the present invention may be as follows:

| x | X | RE1 | a | RE2 | b | RE3 | c | RE4 | d | RE5 | e | Mean Rare-earth Ionic Radius (Å) |
|---|---|---|---|---|---|---|---|---|---|---|---|---|
| 1 | Cl | Y | 0.2 | Yb | 0.2 | Ho | 0.2 | Er | 0.2 | Gd | 0.2 | 0.899 |
| 1 | Cl | Y | 0.8 | Yb | 0.05 | Ho | 0.05 | Er | 0.05 | Gd | 0.05 | 0.900 |
| 1.1 | Cl | Y | 0.9 | Yb | 0.05 | Ho | 0.05 | Er | 0.05 | Gd | 0.05 | 0.900 |

Preferably the solid materials of the invention are selected from the group consisting of: $Li_3Y_{0.9}Gd_{0.1}Cl_6$; $Li_3Y_{0.3}Er_{0.3}Yb_{0.3}Gd_{0.1}Cl_6$, $Li_{2.7}Y_1Gd_{0.1}Cl_6$; $Li_3Y_{0.5}Er_{0.5}Cl_6$; $Li_3Y_{0.45}Er_{0.45}Gd_{0.1}Cl_6$; and $Li_3Y_{0.45}Er_{0.45}La_{0.1}Cl_6$.

Solid materials of the invention may be in powder form with a distribution of particle diameters having a D50 preferably comprised between 0.05 μm and 10 μm. The particle size can be evaluated with SEM image analysis or laser diffraction analysis.

D50 has the usual meaning used in the field of particle size distributions. Dn corresponds to the diameter of the particles for which n % of the particles have a diameter which is less than Dn. D50 (median) is defined as the size value corresponding to the cumulative distribution at 50%. These parameters are usually determined from a distribution in volume of the diameters of a dispersion of the particles of the solid material in a solution, obtained with a laser diffractometer, using the standard procedure predetermined by the instrument software. The laser diffractometer uses the technique of laser diffraction to measure the size of the particles by measuring the intensity of light diffracted as a laser beam passes through a dispersed particulate sample. The laser diffractometer may be the Mastersizer 3000 manufactured by Malvern for instance.

D50 may be notably measured after treatment under ultrasound. The treatment under ultrasound may consist in inserting an ultrasonic probe into a dispersion of the solid material in a solution, and in submitting the dispersion to sonication.

The invention also refers to a method for producing solid materials of the invention, notably solid materials of formulas (I), (Ia), (II), (IIa), (III), (IIIa), (IV), (IVa), (V) and (Va) as previously expressed, comprising reacting at least a lithium halide, at least two different rare-earth metal halides, in such halides the rare-earth metal are different from each other and optionally zirconium or hafnium halide, optionally in one or more solvents.

One or more lithium halides may notably be used.

Solid materials of the invention may be produced by any methods used in the prior art known for producing a glass solid electrolyte, such as for instance a melt extraction method, a mechanical milling method or a slurry method in which raw materials are reacted, optionally in one or more solvents.

Preferably the solid materials of formulas (I), (Ia), (II), (IIa), (III), (IIIa), (IV), (IVa), (V) and (Va) as previously expressed may be produced by dry or wet mechanosynthesis.

The invention then refers to a process for the preparation of a solid materials as previously expressed, notably according to general formulas (I), (Ia), (II), (IIa), (III), (IIIa), (IV), (IVa), (V) and (Va), said process comprising the steps of:

a) obtaining a composition by admixing stoichiometric amounts of a lithium halide, at least two different rare-earth metal halides, in such halides the rare-earth metal are different from each other and optionally zirconium or hafnium halide, optionally in one or more solvents, under an inert atmosphere;
b) applying a mechanical treatment to the composition obtained in step a) in order to obtain the solid material; and
c) optionally removing at least a portion of the one or more solvents from the composition obtained on step b), so that to obtain the solid material.

Inert atmosphere as used in step a) refers to the use of an inert gas; ie. a gas that does not undergo detrimental chemical reactions under conditions of the reaction. Inert gases are used generally to avoid unwanted chemical reactions from taking place, such as oxidation and hydrolysis reactions with the oxygen and moisture in air. Hence inert gas means gas that does not chemically react with the other reagents present in a particular chemical reaction. Within the context of this disclosure the term "inert gas" means a gas that does not react with the solid material precursors. Examples of an "inert gas" include, but are not limited to, nitrogen, helium, argon, carbon dioxide, neon, xenon, $O_2$ with less than 1000 ppm of liquid and airborne forms of water, including condensation. The gas can also be pressurized.

It is preferred that stirring be conducted when the raw materials are brought into contact with each other under an atmosphere of an inert gas such as nitrogen or argon. The dew point of an inert gas is preferably −20° C. or less, particularly preferably −40° C. or less. The pressure may be from 0.0001 Pa to 100 MPa, preferably from 0.001 Pa to 20 MPa, preferably from 0.01 Pa to 0.5 MPa.

Preferably in step a), inert atmosphere comprises an inert gas such as dry $N_2$, dry Argon or dry air (dry may refer to a gas with less than 800 ppm of liquid and airborne forms of water, including condensation).

The composition ratio of each element can be controlled by adjusting the amount of the raw material compound when the solid material is produced. The precursors and their molar ratio are selected according to the target stoichiometry. The target stoichiometry defines the ratio between the elements Li, RE, T and X, which is obtainable from the applied amounts of the precursors under the condition of complete conversion without side reactions and other losses.

Lithium halide refers to a compound including one or more of sulfur atoms and one or more of halogen atoms, or alternatively, one or more of halogen containing ionic groups and one or more of lithium containing ionic groups. In certain preferred aspects, lithium halide may consist of halogen atoms and lithium atoms. Preferably, lithium halide is LiCl, LiBr, LiF, and LiI.

Rare-earth metal halide compounds refer to a compound including one or more of halogen atoms such as F, Cl, Br, or I via chemical bond (e.g., ionic bond or covalent bond) to the other atoms constituting the compound. In certain preferred aspect, the halogen compound may include one or more of F, Cl, Br, I, or combinations thereof and one or more rare-earth metal atoms. Non-limiting examples may suitably include $YCl_3$, $ErCl_3$, $YbCl_3$, $GdCl_3$, $LaCl_3$, $YBr_3$, $ErBr_3$, $YbBr_3$, $GdBr_3$, and $LaBr_3$. Mixed rare-earth halides $REX_3$ can also be used as precursors, non limiting examples are (Y, Yb, Er)$Cl_3$ and (La, Y)$Cl_3$. Rare-earth metal halide compounds are preferably selected from the group consisting of $YCl_3$, $ErCl_3$, $YbCl_3$, $GdCl_3$, $LaCl_3$, $YBr_3$, $ErBr_3$, $YbBr_3$, $GdBr_3$, $LaBr_3$, (Y, Yb, Er)$Cl_3$ and (La, Y)$Cl_3$.

It is perfectly possible to use one or several rare-earth metal halides, notably in which the rare-earth metals are different from each other.

Preferably, lithium halides and rare-earth halides have an average particle diameter comprised between 0.5 μm and 400 μm. The particle size can be evaluated with SEM image analysis or laser diffraction analysis.

It is also possible to add in the composition of step a) a dopant, preferably an aliovalent dopant to create lithium vacancies, such as zirconium or hafnium for instance. Any zirconium or hafnium halide including one or more of halogen atoms such as F, Cl, Br, or I added in the compostion of step a) are suitable for this purpose. Preferably $ZrCl_4$ is added in the composition of step a).

The composition in step a) may also comprise one or more solvent. The solvent may suitably be selected from one or more of polar or non-polar solvents that are not dissolving lithium halides and rare-earth metal halides.

Solvent of the invention then constitutes in step a) a continuous phase with dispersion of one or more of the above described components.

Depending on the components and the solvent, some of the components are then rather dissolved, partially dissolved or under a form of a slurry. (ie. component(s) is/are not dissolved and forming then a slurry with the solvent).

In certain preferred aspect, the solvent may suitably an apolar solvent. Solvents are preferably chosen in the group consisting of: aliphatic hydrocarbons, such as hexane, pentane, 2-ethylhexane, heptane, decane, and cyclohexane; and aromatic hydrocarbons, such as xylene and toluene.

It is understood that references herein to "a solvent" includes one or more mixed solvents.

An amount of about 1 wt % to 80 wt % of the powder mixture and an amount of about 20 wt % to 99 wt % of the solvent, based on the total weight of the powder mixture and the solvent, may be mixed. Preferably, an amount of about 25 wt % to 75 wt % of the powder mixture and an amount of 25 wt % to 75 wt % of the solvent, based on the total weight of the powder mixture and the solvent, may be mixed. Particularly, an amount of about 40 wt % to 60 wt % of the powder mixture and an amount of about 40 wt % to 60 wt % of the solvent, based on the total weight of the powder mixture and the solvent, may be mixed.

The temperature of step a) in presence of solvent is preferably between the fusion temperature of the selected solvent and ebullition temperature of the selected solvent at a temperature where no unwanted reactivity is found between solvent and admixed compounds. Preferably step a) is done between −20° C. and 40° C. and more preferably between 15° C. and 40° C. In absence of solvent step a) is done at a temperature between −20° C. and 200° C. and preferably between 15° C. and 40° C.

Duration of step a) is preferably between 1 minute and 1 hour.

Mechanical treatment to the composition in step b) may be performed by wet or dry milling; notably be performed by adding the powder mixture to a solvent and then milling at about 100 rpm to 1000 rpm, notably for a duration from 10 minutes to 80 hours more preferably for about 4 hours to 40 hours.

Said milling is also known as reactive-milling in the conventional synthesis of lithium rare-earth halides.

The mechanical milling method also has an advantage that, simultaneously with the production of a glass mixture, pulverization occurs. In the mechanical milling method, various methods such as a rotation ball mill, a tumbling ball mill, a vibration ball mill and a planetary ball mill or the like can be used. Mechanical milling may be made with or without balls such as $ZrO_2$.

In such a condition, lithium halides and rare-earth halides are allowed to react for a predetermined period of time.

The temperature of step b) in presence of solvent is between the fusion temperature of the selected solvent and ebullition temperature of the selected solvent at a temperature where no unwanted reactivity is found between solvent and compounds. Preferably step b) is done at a temperature between −20° C. and 80° C. and more preferably between 15° C. and 40° C. In absence of solvent step a) is done between −20° C. and 200° C. and preferably between 15° C. and 40° C.

Usually a paste or a blend of paste and liquid solvent may be obtained at the end of step b).

Optionally in step c) it's perfectly possible to remove at least a part of the solvent, for instance in order to remove at least about 30%, 40%, 50%, 60%, 70%, 80%, 90% 95% or 100%, of the total weight of a solvent used, or any ranges comprised between these values, such as from 30% to 100% or 50% to 90%. Solvent removal may be carried out by known methods used in the art, such as decantation, filtration, centrifugation, drying or a combination thereof.

Preferably when drying is selected as method for solvent removal, temperature is selected below ebullition temperature and as a function of vapor partial pressure of the selected solvent.

Duration is between 1 second and 100 hours, preferably between 1 hour and 20 hours. Such a low duration may be obtained for instance by using a flash evaporation, such as by spray drying.

Removal of the solvent may be conducted under an atmosphere of an inert gas such as nitrogen or argon. The dew point of an inert gas is preferably −20° C. or less, particularly preferably −40° C. or less. The pressure may be from 0.0001 Pa to 100 MPa, preferably from 0.001 Pa to 20 MPa, preferably from 0.01 Pa to 20 MPa. Notably the pressure may range from 0.0001 Pa to 0.001 Pa, notably by using ultravacuum techniques. Notably the pressure may range from 0.01 Pa to 0.1 MPa by using primary vacuum techniques.

It's also perfectly possible to heat the solid material after step b) or step c). The heating, or thermal treatment, may notably allow converting the amorphized powder mixture (glass) obtained above into a solid material crystalline or mixture of glass and crystalline (glass ceramics).

Heat treatment is carried out at a temperature in the range of from 50° C. to 700° C., notably for a duration of 1 minute to 100 hours, preferably from 30 minutes to 20 hours. In some embodiments, heat treatment is carried out at a temperature in the range of from 100° C. to 400° C. In some other embodiments, heat treatment is carried out at a temperature in the range of from 150° C. to 300° C. Heat treatment may start directly at high temperature or via a ramp of temperature at a rate comprised between 1° C./min to 20° C./min. Heat treatment may finish with an air quenching or via natural cooling from the heating temperature or via a controlled ramp of temperature at a rate comprised between 1° C./min to 20° C./min.

Such as treatment may be made under an inert atmosphere comprising an inter gas such as dry $N_2$, or dry Argon (dry may refer to a gas with less than 800 ppm of liquid and airborne forms of water, including condensation). Preferably the inert atmosphere is a protective gas atmosphere used in order to minimize, preferably exclude access of oxygen and moisture.

The pressure at the time of heating may be at normal pressure or under reduced pressure. The atmosphere may be inert gas, such as nitrogen and argon. The dew point of the inert gas is preferably −20° C. or less, with −40° C. or less being particularly preferable. The pressure may be from 0.0001 Pa to 100 MPa, preferably from 0.001 Pa to 20 MPa, preferably from 0.01 Pa to 20 MPa. Notably the pressure may range from 0.0001 Pa to 0.001 Pa, notably by using ultravacuum techniques. Notably the pressure may range from 0.01 Pa to 0.1 MPa by using primary vacuum techniques.

It is also possible to treat the solid material to the desired particle size distribution, notably after step b), step c) or after the heat treatment. If necessary, the solid material obtained by the process according to the invention as described above is ground (e.g. milled) into a powder. Preferably, said powder has a D50 value of the particle size distribution of less than 100 μm, more preferably less than 10 μm, most preferably less than 5 μm, as determined by means of dynamic light scattering or image analysis.

Preferably, said powder has a D90 value of the particle size distribution of less than 100 m, more preferably less than 10 μm, most preferably less than 5 μm, as determined by means of dynamic light scattering or image analysis. Notably, said powder has a D90 value of the particle size distribution comprised from 1 μm to 100.

In some embodiments where the process is conducted in the presence of one or more solvent, the solid materials of formulas (I), (Ia), (II), (IIa), (III), (IIIa), (IV), (IVa), (V) and (Va) as expressed are produced by wet mechanosynthesis.

The invention then refers to a process for the preparation of a solid materials as expressed, notably according to general formulas (I), (Ia), (II), (IIa), (III), (IIIa), (IV), (IVa), (V) and (Va), said process comprising the steps of:

a) obtaining a composition by admixing stoichiometric amounts of a lithium halide, at least a rare-earth metal halide and optionally zirconium or hafnium halide, in one or more solvents, under an inert atmosphere;
b) applying a mechanical treatment to the composition obtained in step a) in order to obtain the solid material; and
c) removing at least a portion of the one or more solvents from the composition obtained on step b), so that to obtain the solid material.

The invention also refers to a process for the preparation of a solid material according to general formula (I) as follows:

$$Li_{6-3x-4y}RE_xT_yX_6 \quad (I)$$

wherein:

X is a halogen;

$0<x+(4/3)y<2$; preferably $0.8\leq x+(4/3)y\leq 1.5$; more preferably $0.95\leq x+(4/3)y\leq 1.25$;

$0\leq y\leq 0.8$; preferably $0.1\leq y\leq 0.7$; more preferably $0.2\leq y\leq 0.6$;

RE denotes one or more rare-earth metals; the rare-earth metals are different from each other; and T is Zr or Hf;

said process comprising the steps of:

a) obtaining a composition by admixing stoichiometric amounts of a lithium halide, at least a rare-earth metal halide and optionally zirconium or hafnium halide, in one or more solvents, under an inert atmosphere;
b) applying a mechanical treatment to the composition obtained in step a) in order to obtain the solid material; and
c) removing at least a portion of the one or more solvents from the composition obtained on step b), so that to obtain the solid material.

Hence, the invention also refers to a process for the preparation of a solid material according to any general formulae (II) to (V) as follows:

$$Li_{6-3x-4y}RE1_aRE2_bT_yX_6 \quad (II)$$

wherein $a+b=x$, with $0.05\leq a\leq 0.95$ and $0.0<b\leq 0.95$; preferably $0.5\leq a\leq 0.9$ and $0.05<b\leq 0.5$;

$$Li_{6-3x-4y}RE1_aRE2_bRE3_cT_yX_6 \quad (III)$$

wherein $a+b+c=x$, with $0.05\leq a\leq 0.95$, $0.0<b\leq 0.95$ and $0.0<c\leq 0.95$ with $0.05\leq b+c$;

$$Li_{6-3x-4y}RE1_aRE2_bRE3_cRE4_dT_yX_6 \quad (IV)$$

wherein $a+b+c+d=x$, with $0.05\leq a\leq 0.95$, $0.0<b\leq 0.95$, $0.0<c\leq 0.95$ and $0.0<d\leq 0.95$ with $0.05\leq b+c+d$;

$$Li_{6-3x-4y}RE1_aRE2_bRE3_cRE4_dRE5_eT_yX_6 \quad (V)$$

wherein $a+b+c+d+e=x$, with $0.05\leq a\leq 0.95$, $0.0<b\leq 0.95$, $0.0<c\leq 0.95$, $0.0<d\leq 0.95$ and $0.0<e\leq 0.95$, with $0.05\leq b+c+d+e$; and wherein X is a halogen;

$0<x+(4/3)y<2$; preferably $0.8\leq x+(4/3)y\leq 1.5$; more preferably $0.95\leq x+(4/3)y\leq 1.25$;

$0\leq y\leq 0.8$; preferably $0.1\leq y\leq 0.7$; more preferably $0.2\leq y\leq 0.6$;

RE1 is selected from the group consisting of: Y, Yb, Ho, Er;

RE2 is selected from the group consisting of: Yb, Ho, Gd, Er, Sm, Dy, La, Nd, Ce, Tb;

RE3 is selected from the group consisting of: Ho, Gd, Er, Sm, Dy La, Nd, Ce, Tb;

RE4 is selected from the group consisting of: Er, Gd Sm, Dy La, Nd, Ce, Tb; and

RE5 is selected from the group consisting of: Gd Sm, Dy La, Nd, Ce, Tb; where RE1, RE2, RE3, RE4 and RE5 are different; and T is Zr or Hf;

said process comprising the steps of:

a) obtaining a composition by admixing stoichiometric amounts of a lithium halide, at least two different rare-earth metal halides, in such halides the rare-earth metal are different from each other and optionally zirconium or hafnium halide, in one or more solvents, under an inert atmosphere;

b) applying a mechanical treatment to the composition obtained in step a) in order to obtain the solid material; and c) removing at least a portion of the one or more solvents from the composition obtained on step b), so that to obtain the solid material.

The invention furthermore concerns a solid material susceptible to be obtained by said process.

The invention also refers to a solid material as previously described and obtainable according to the processes of the invention, such as solid materials of formulas (I), (Ta), (II), (IIa), (III), (IIIa), (IV), (IVa), (V) and (Va), as solid electrolyte, as well as a solid electrolyte comprising at least a solid material previously described and obtainable according to the processes of the invention, such as solid materials of formulas (I), (Ia), (II), (IIa), (III), (IIIa), (IV), (IVa), (V) and (Va).

Said solid electrolytes comprises then at least a solid material of formulas (I), (Ia), (II), (IIa), (III), (IIIa), (IV), (IVa), (V) and (Va) and optionally another solid electrolyte, such as a lithium argyrodites, lithium thiophosphates, such as glass or glass ceramics sulfides $Li_3PS_4$, $Li_7PS_{11}$, and lithium conducting oxides such as lithium stuffed garnets $Li_7La_3Zr_2O_{12}$ (LLZO).

Said solid electrolytes may also optionally comprise polymers such as styrene butadiene rubbers, organic or inorganic stabilizers such as $SiO_2$ or dispersants.

The invention also concerns an electrochemical device comprising a solid electrolyte comprising at least a solid material as previously described and obtainable according to the processes of the invention, such as solid materials of formulas (I), (Ia), (II), (IIa), (III), (IIIa), (IV), (IVa), (V) and (Va).

Preferably in the electrochemical device, particularly a rechargeable electrochemical device, the solid electrolyte is a component of a solid structure for an electrochemical device selected from the group consisting of cathode, anode and separator.

Herein preferably, the solid electrolyte is a component of a solid structure for an electrochemical device, wherein the solid structure is selected from the group consisting of cathode, anode and separator. Accordingly, the solid materials according to the invention can be used alone or in combination with additional components for producing a solid structure for an electrochemical device, such as a cathode, an anode or a separator.

The electrode where during discharging a net negative charge occurs is called the anode and the electrode where during discharging a net positive charge occurs is called the cathode. The separator electronically separates a cathode and an anode from each other in an electrochemical device.

Suitable electrochemically active cathode materials and suitable electrochemically active anode materials are well known in the art. In an electrochemical device according to the invention, the anode preferably comprises graphitic carbon, metallic lithium, silicon compounds such as Si, $SiO_x$, lithium titanates such as $Li_4Ti_5O_{12}$ or a metal alloy comprising lithium as the anode active material such as Sn.

In an electrochemical device according to the invention, the cathode preferably comprises a metal chalcogenide of formula $LiMQ_2$, wherein M is at least one metal selected from transition metals such as Co, Ni, Fe, Mn, Cr and V and Q is a chalcogen such as O or S. Among these, it is preferred to use a lithium-based composite metal oxide of formula $LiMO_2$, wherein M is the same as defined above. Preferred examples thereof may include $LiCoO_2$, $LiNiO_2$, $LiNi_xCo_{1-x}O_2$ ($0<x<1$), and spinel-structured $LiMn_2O_4$. Another preferred examples thereof may include lithium-nickel-manganese-cobalt-based metal oxide of formula $LiNi_xMn_yCo_zO_2$($x+y+z=1$, referred to as NMC), for instance $LiN_{1/3}Mn_{1/3}Co_{1/3}O_2$, $LiNi_{0.6}Mn_{0.2}Co_{0.2}O_2$, and lithium-nickel-cobalt-aluminum-based metal oxide of formula $LiNi_xCo_yAl_zO_2$ ($x+y+z=1$, referred to as NCA), for instance $LiNi_{0.8}Co_{0.15}Al_{0.05}O_2$. Cathode may comprise a lithiated or partially lithiated transition metal oxyanion-based material such as $LiFePO_4$.

For example, the electrochemical device has a cylindrical-like or a prismatic shape. The electrochemical device can include a housing that can be from steel or aluminum or multilayered films polymer/metal foil.

A further aspect of the present invention refers to batteries, more preferably to an alkali metal battery, in particular to a lithium battery comprising at least one inventive electrochemical device, for example two or more. Electrochemical devices can be combined with one another in inventive alkali metal batteries, for example in series connection or in parallel connection.

The invention also concerns a solid state battery comprising a solid electrolyte comprising at least a solid material as previously described and obtainable according to the processes of the invention, such as solid materials of formulas (I), (Ia), (II), (IIa), (III), (IIIa), (IV), (IVa), (V) and (Va).

Typically, a lithium solid-state battery includes a positive electrode active material layer containing a positive electrode active material, a negative electrode active material layer containing a negative electrode active material, and a solid electrolyte layer formed between the positive electrode active material layer and the negative electrode active material layer. At least one of the positive electrode active material layer, the negative electrode active material layer, and the solid electrolyte layer includes a solid electrolyte as defined above.

The cathode of an all-solid-state electrochemical device usually comprises beside an active cathode material as a further component a solid electrolyte. Also the anode of an all-solid state electrochemical device usually comprises a solid electrolyte as a further component beside an active anode material.

The form of the solid structure for an electrochemical device, in particular for an all-solid-state lithium battery, depends in particular on the form of the produced electrochemical device itself. The present invention further provides a solid structure for an electrochemical device wherein the solid structure is selected from the group consisting of cathode, anode and separator, wherein the solid structure for an electrochemical device comprises a solid material according to the invention.

A plurality of electrochemical cells may be combined to an all solid-state battery, which has both solid electrodes and solid electrolytes.

The solid material disclosed above may be used in the preparation of an electrode. The electrode may be a positive electrode or a negative electrode.

The electrode typically comprises at least:

a metal substrate;

directly adhered onto said metal substrate, at least one layer made of a composition comprising:

(i) a solid material as previously described and obtainable according to the processes of the invention, such as solid materials of formulas (I), (Ia), (II), (IIa), (III), (IIIa), (IV), (IVa), (V) and (Va);
(ii) at least one electro-active compound (EAC);
(iii) optionally at least one lithium ion-conducting material (LiCM) other than the solid material of the invention;
(iv) optionally at least one electro-conductive material (ECM);
(v) optionally a lithium salt (LIS); and
(vi) optionally at least one polymeric binding material (P).

The electro-active compound (EAC) denotes a compound which is able to incorporate or insert into its structure and to release lithium ions during the charging phase and the discharging phase of an electrochemical device. An EAC may be a compound which is able to intercale and deintercalate into its structure lithium ions. For a positive electrode, the EAC may be a composite metal chalcogenide of formula $LiMeQ_2$ wherein:

Me is at least one metal selected in the group consisting of Co, Ni, Fe, Mn, Cr, Al and V;
Q is a chalcogen such as O or S.

The EAC may more particularly be of formula $LiMeO_2$. Preferred examples of EAC include $LiCoO_2$, $LiNiO_2$, $LiMnO_2$, $LiNi_xCo_{1-x}O_2$ (0<x<1), $LiNi_xCo_yMn_zO_2$ (0<x, y, z<1 and x+y+z=1) for instance $LiNi_{1/3}Mn_{1/3}Co_{1/3}O_2$, $LiNi_{0.6}Mn_{0.2}Co_{0.2}O_2$, $LiNi_{0.8}Mn_{0.1}Co_{0.1}O_2$, $Li(Ni_xCo_yAl_z)O_2$ (x+y+z=1) and spinel-structured $LiMn_2O_4$ and $Li(Ni_{0.5}Mn_{1.5})O_4$.

The EAC may also be a lithiated or partially lithiated transition metal oxyanion-based electro-active material of formula $M_1M_2(JO_4)_fE_{1-f}$, wherein:

$M_1$ is lithium, which may be partially substituted by another alkali metal representing less than 20% of Mi;
$M_2$ is a transition metal at the oxidation level of +2 selected from Fe, Co, Mn, Ni or mixtures thereof, which may be partially substituted by one or more additional metals at oxidation levels between +1 and +5 and representing less than 35% of the $M_2$ metals, including 0;
$JO_4$ is any oxyanion wherein J is either P, S, V, Si, Nb, Mo or a combination thereof;
E is a fluoride, hydroxide or chloride anion;
f is the molar fraction of the $JO_4$ oxyanion, generally comprised between 0.75 and 1.

The $M_1M_2(JO_4)_fE_{1-f}$ electro-active material as defined above is preferably phosphate-based. It may exhibit an ordered or modified olivine structure.

For a positive electrode, the EAC may also be sulfur or $Li_2S$.

For a positive electrode, the EAC may also be a conversion-type materials such as $FeS_2$ or $FeF_2$ or $FeF_3$ For a negative electrode, the EAC may be selected in the group consisting of graphitic carbons able to intercalate lithium. More details about this type of EAC may be found in Carbon 2000, 38, 1031-1041. This type of EAC typically exists in the form of powders, flakes, fibers or spheres (e.g. mesocarbon microbeads).

The EAC may also be: lithium metal; lithium alloy compositions (e.g. those described in U.S. Pat. No. 6,203,944 and in WO 00/03444); lithium titanates, generally represented by formula $Li_4Ti_5O_{12}$; these compounds are generally considered as "zero-strain" insertion materials, having low level of physical expansion upon taking up the mobile ions, i.e. $Li^+$; lithium-silicon alloys, generally known as lithium silicides with high Li/Si ratios, in particular lithium silicides of formula $Li_{4.4}Si$ and lithium-germanium alloys, including crystalline phases of formula $Li_{4.4}Ge$. EAC may also be composite materials based on carbonaceous material with silicon and/or silicon oxide, notably graphite carbon/silicon and graphite/silicon oxide, wherein the graphite carbon is composed of one or several carbons able to intercalate lithium.

The ECM is typically selected in the group consisting of electro-conductive carbonaceous materials and metal powders or fibers. The electron-conductive carbonaceous materials may for instance be selected in the group consisting of carbon blacks, carbon nanotubes, graphite, graphene and graphite fibers and combinations thereof. Examples of carbon blacks include ketjen black and acetylene black. The metal powders or fibers include nickel and aluminum powders or fibers.

The lithium salt (LIS) may be selected in the group consisting of $LiPF_6$, lithium bis(trifluoromethanesulfonyl) imide, lithium bis(fluorosulfonyl)imide, $LiB(C_2O_4)_2$, $LiAsF_6$, $LiClO_4$, $LiBF_4$, $LiAlO_4$, $LiNO_3$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiCF_3SO_3$, $LiAlCl_{14}$, $LiSbF_6$, LiF, LiBr, LiCl, LiOH and lithium 2-trifluoromethyl-4,5-dicyanoimidazole.

The function of the polymeric binding material (P) is to hold together the components of the composition. The polymeric binding material is usually inert. It preferably should be also chemically stable and facilitate the electronic and ionic transport. The polymeric binding material is well known in the art. Non-limitative examples of polymeric binder materials include notably, vinylidenefluoride (VDF)-based (co)polymers, styrene-butadiene rubber (SBR), styrene-ethylene-butylene-styrene (SEBS), carboxymethylcellulose (CMC), polyamideimide (PAI), poly (tetrafluoroethylene) (PTFE) and poly(acrylonitrile) (PAN) (co)polymers.

The proportion of the solid material of the invention in the composition may be between 0.1 wt % to 80 wt %, based on the total weight of the composition. In particular, this proportion may be between 1.0 wt % to 60 wt %, more particularly between 5 wt % to 30 wt %. The thickness of the electrode is not particularly limited and should be adapted with respect to the energy and power required in the application. For example, the thickness of the electrode may be between 0.01 mm to 1,000 mm.

The inorganic material M may also be used in the preparation of a separator. A separator is an ionically permeable membrane placed between the anode and the cathode of a battery. Its function is to be permeable to the lithium ions while blocking electrons and assuring the physical separation between the electrodes.

The separator of the invention typically comprises at least:

a solid material as previously described and obtainable according to the processes of the invention, such as solid materials of formulas (I), (Ia), (II), (IIa), (III), (IIIa), (IV), (IVa), (V) and (Va);
optionally at least one polymeric binding material (P);
optionally at least one metal salt, notably a lithium salt; and
optionally at least one plasticizer.

The electrode and the separator may be prepared using methods well-known to the skilled person. This is usually mixing the components in an appropriate solvent and removing the solvent. Appropriate solvents are inert toward solid material of the invention and thus not dissolving it. Solvents used for the preparation of the solid material of the invention may be used for the preparation of the electrodes or separator layers; such as for instance xylene.

For instance, the electrode may be prepared by the process which comprises the following steps:

a slurry comprising the components of composition and at least one solvent is applied onto the metal substrate;

the solvent is removed.

Usual techniques known to the skilled person are the following ones: coating and calendaring, dry and wet extrusion, 3D printing, sintering of porous foam followed by impregnation. Usual techniques of preparation of the electrode and of the separator are provided in Journal of Power Sources, 2018 382, 160-175.

The electrochemical devices, notably batteries such as solid state batteries described herein, can be used for making or operating cars, computers, personal digital assistants, mobile telephones, watches, camcorders, digital cameras, thermometers, calculators, laptop BIOS, communication equipment or remote car locks, and stationary applications such as energy storage devices for power plants.

The electrochemical devices, notably batteries such as solid state batteries described herein, can notably be used in motor vehicles, bicycles operated by electric motor, robots, aircraft (for example unmanned aerial vehicles including drones), ships or stationary energy storages. Preferred are mobile devices such as are vehicles, for example automobiles, bicycles, aircraft, or water vehicles such as boats or ships. Other examples of mobile devices are those which are portable, for example computers, especially laptops, telephones or electrical power tools, for example from the construction sector, especially drills, battery-driven screwdrivers or battery-driven tackers.

Should the disclosure of any patents, patent applications, and publications which are incorporated herein by reference conflict with the description of the present application to the extent that it may render a term unclear, the present description shall take precedence.

FIGURES

FIG. 1: powder XRD pattern of $Li_3YCl_6$ obtained by dry mechanochemistry in Example 1.

Figure 2:
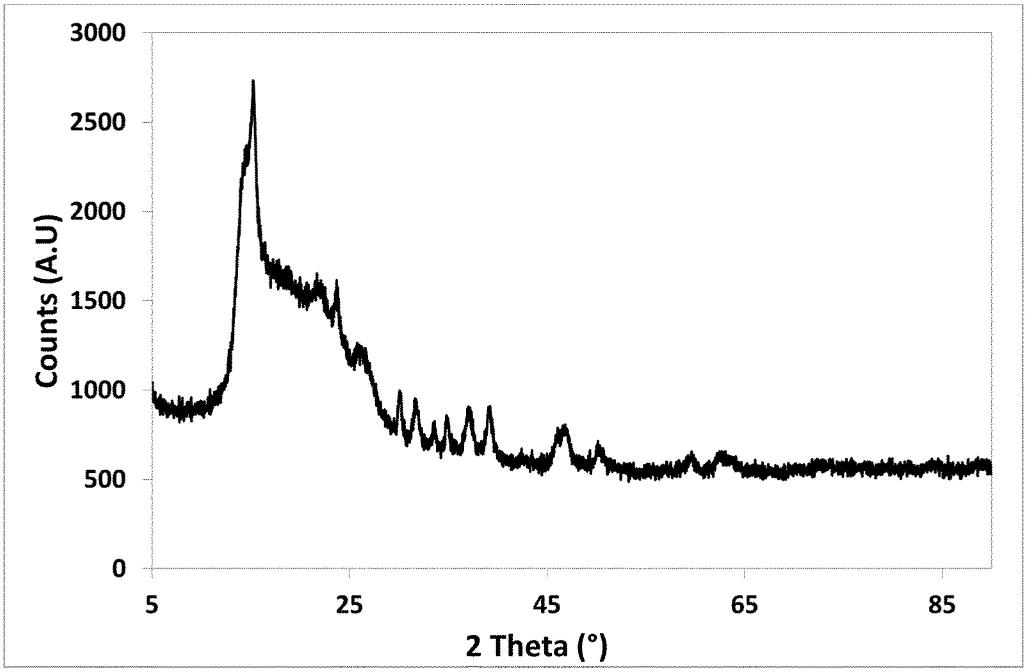

FIG. 2: powder XRD pattern of $Li_3GdCl_6$ obtained by dry mechanochemistry in Example 2.

Figure 3:
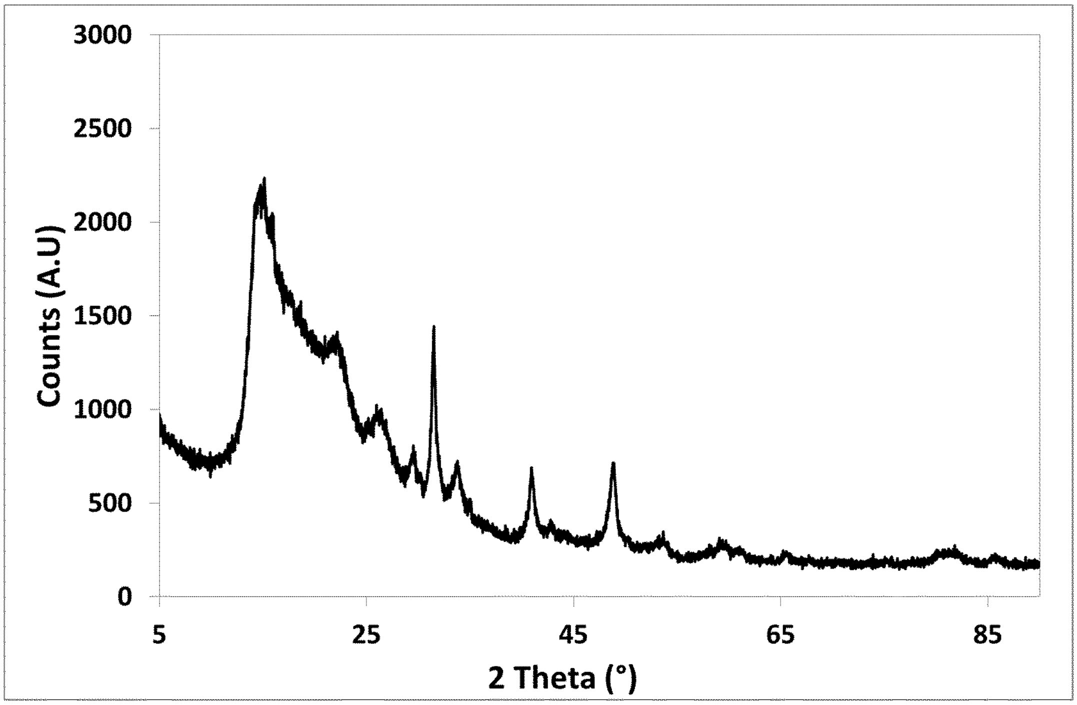

FIG. 3: powder XRD pattern of $Li_3Y_{0.9}Gd_{0.1}Cl_6$ obtained by dry mechanochemistry in Example 3.

Figure 4:
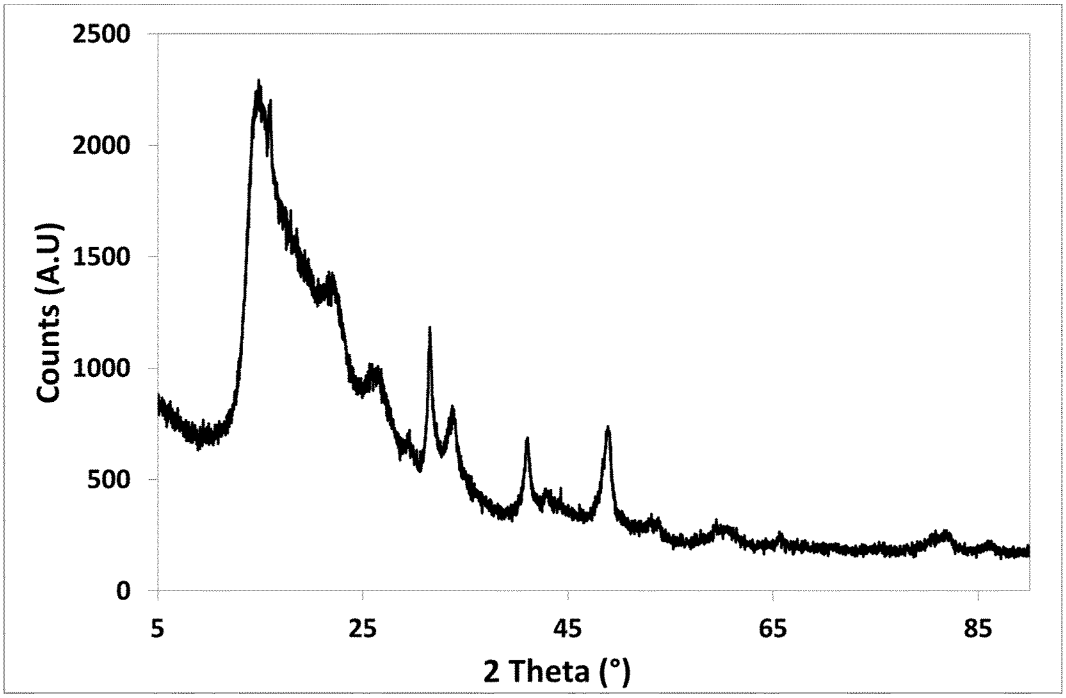

FIG. 4: powder XRD pattern of $Li_3Y_{0.3}Er_{0.3}Yb_{0.3}Gd_{0.1}Cl_6$ obtained by dry mechanochemistry in Example 4.

Figure 5:
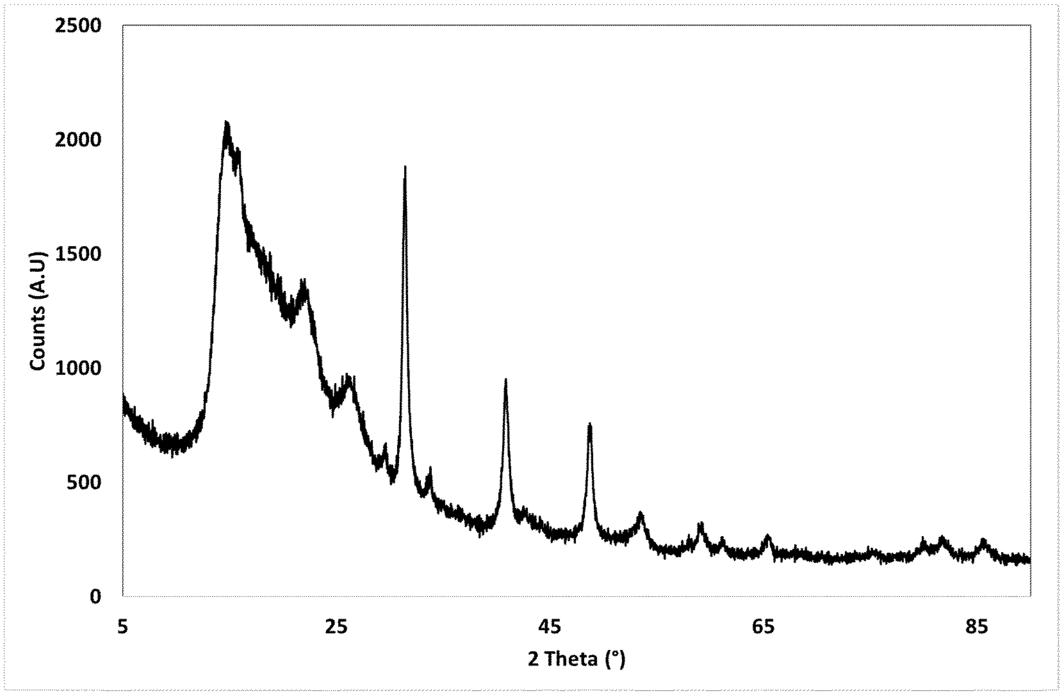

FIG. 5: powder XRD pattern of $Li_{2.7}YGd_{0.1}Cl_6$ obtained by dry mechanochemistry in Example 5.

Figure 6:
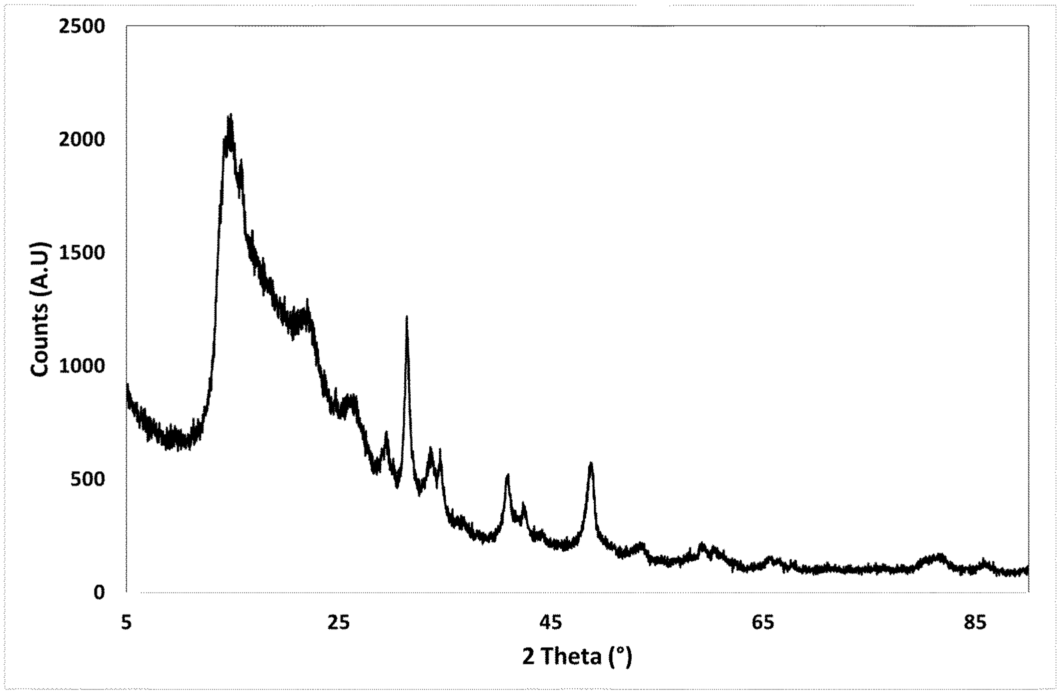

FIG. 6: powder XRD pattern of $Li_3(Y_{0.45}Er_{0.45}Gd_{0.1})Cl_6$ obtained by wet mechanochemistry in Example 6.

Figure 7:
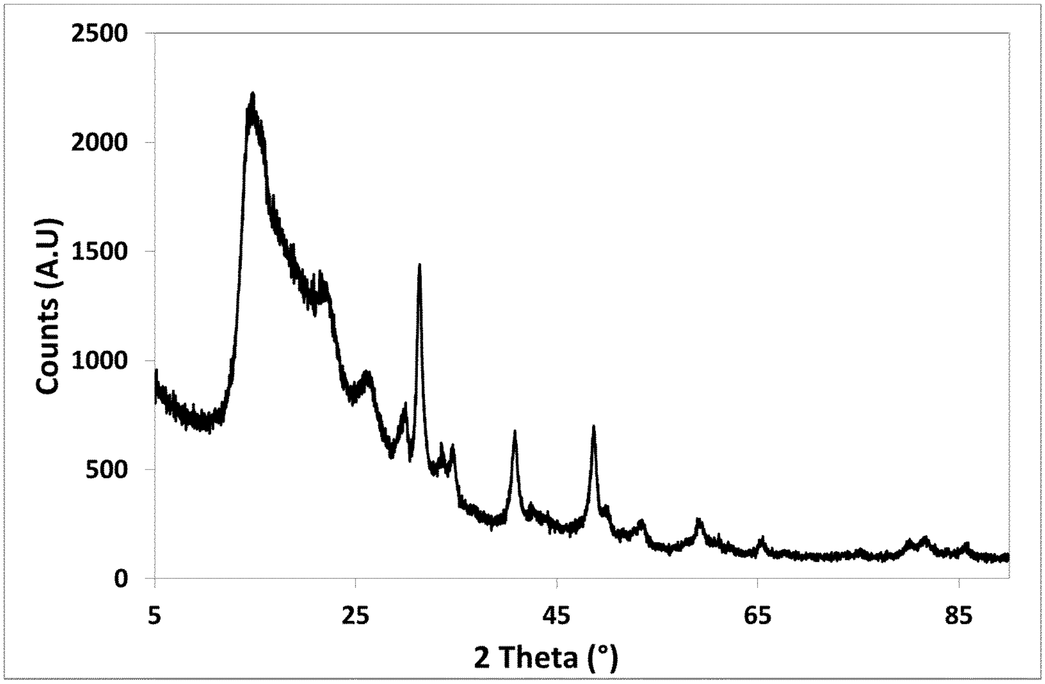

FIG. 7: powder XRD pattern of $Li_3YCl_6$ obtained by wet mechanochemistry in Example 8.

EXPERIMENTAL PART

The examples below serve to illustrate the invention, but have no limiting character.

X-Ray Diffraction

The XRD diffractograms of the powders were acquired on a XRD goniometer in the Bragg Brentano geometry, with a Cu X Ray tube (Cu Kalpha wavelength of 1.5406 Å). The setup may be used in different optical configurations, i.e. with variable or fixed divergence slits, or Soller slits. A filtering device on the primary side may also be used, like a monochromator or a Bragg Brentano HD optics from Panalytical. If variable divergence slits are used; the typical illuminated area is 10 mm×10 mm. The sample holder is loaded on a spinner; rotation speed is typically 60 rpm during the acquisition. Tube settings were operating at 40 kV/30 mA for variable slits acquisition and at 45 kV/40 mA for fixed slits acquisition with incident Bragg Brentano HD optics. Acquisition step was 0.0170 per step. Angular range is typically 5° to 900 in two theta or larger. Total acquisition time was typically 30 min or longer. The powders are covered by a Kapton film to prevent reactions with air moisture.

Conductivity Measurements

The conductivity was acquired on pellets done using a uniaxial press operated at 500 MPa. Pelletizing was done using a lab scale uniaxial press in glovebox filled with moisture free Argon atmosphere. Two carbon paper foils (Papyex soft graphite N998 Ref: 496300120050000, 0.2 mm thick from Mersen) are used as current collector. The measurement is done in a swagelock cell closed using a manual spring. The impedance spectra are acquired on a Biologic VMP3 device and the control of temperature is ensured by a Binder climatic chamber. Duration of two hours is set to allow the temperature to be equilibrated between two measurements. Impedance spectroscopy is acquired in PEIS mode with an amplitude of 10 mV and a range of frequencies from 1 MHz to 1 kHz (25 points per decade and a mean of 50 measurements per frequency point). Electronic conductivities are acquired by imposing a potential difference of 1V during 2 minutes and measuring the resultant current to extract the electronic resistance of the pellet.

Example 1: Comparative—$Li_3YCl_6$ by Dry Mechanochemistry

The weighing of precursors and preparation of the sample was carried out in an Ar-filled glovebox with oxygen and moisture levels both below 1 ppm. In a typical experiment, a 30 mL glass vial is used to weight LiCi (≥99.9%, Sigma Aldrich, 1.98 g) and dry $YCl_3$ (≥99%, Sigma Aldrich, 3.004 g) according to the target stoichiometry $Li_3YCl_6$. Precursors used here were powders having an average particle diameter comprised between 10 μm and 400 μm.

The sample has been poured in a 20 mL $ZrO_2$ milling jar which contained 30 g of diameter 5 mm $ZrO_2$ balls. The jar was equipped with a Viton seal and hermetically closed with Ar atmosphere inside the jar. The jar was removed from the glovebox and set inside a planetary ball-milling (Pulverisette 7 premium line, Fritsch). The mechanosynthesis has been carried out at 600 rpm during 10 min for 207 cycles with a 10 min rest period between each cycle.

After the end of the mechanosynthesis the jar was entered in the glovebox. The grey powder obtained has been recovered and the XRD was in accordance with the reported pattern of $Li_3YCl_6$ (orthorhombic phase). The white part of the powder was recovered separately and presented a large amount of precursors.

The transport properties of the grey powder have been measured after pelletizing:

Ionic conductivity measured at 20° C.: 0.16 mS/cm

Activation energy for lithium transport: 0.42 eV

Electronic conductivity at 20° C.: 3.17E-09 S/cm

Example 2: Comparative—$Li_3GdCl_6$ by Dry Mechanochemistry

The weighing of precursors and preparation of the sample was carried out in an Ar-filled glovebox with oxygen and moisture levels both below 1 ppm. In a typical experiment, a 30 mL glass vial has been used to weight LiCl (≥99.9%, Sigma Aldrich, 1.24 g) and dry $GdCl_3$ (≥99%, Sigma Aldrich, 2.58 g) according to the target stoichiometry $Li_3GdCl_6$. The sample was poured in a 20 mL $ZrO_2$ milling jar which contained 30 g of diameter 5 mm $ZrO_2$ balls. The jar was equipped with a Viton seal and hermetically closed (Ar atmosphere inside the jar). The jar was removed from the glovebox and set inside a planetary ball-milling (Pulverisette 7 premium line, Fritsch). The mechanosynthesis was carried out at 600 rpm during 10 min for 155 cycles with a 10 min rest period between each cycle.

After the end of the mechanosynthesis the jar was entered in the glovebox. The grey powder obtained has been recovered and the XRD was in accordance with the reported pattern of $LiGdCl_4$ and LiCi (tetragonal I41/a phase). The white part of the powder was recovered separately and presented a large amount of precursors ($GdCl_3$ and LiCl).

The transport properties of the grey powder have been measured after pelletizing:

Ionic conductivity measured at 20° C.: 0.0009 mS/cm
Activation energy for lithium transport: 0.5 eV
Electronic conductivity at 20° C.: 2E-09 S/cm Example 3: $Li_3Y_{0.9}Gd_{0.1}Cl_6$ by Dry Mechanochemistry The weighing of precursors and preparation of the sample was carried out in an Ar-filled glovebox with oxygen and moisture levels both below 1 ppm. In a typical experiment, a 30 mL glass vial has been used to weight LiCl (≥99.9%, Sigma Aldrich, 1.25 g), dry $YCl_3$ (≥99.9%, Sigma Aldrich, 1.72 g) and dry $GdCl_3$ (≥99%, Sigma Aldrich, 0.26 g) according to the target stoichiometry $Li_3Y_{0.9}Gd_{0.1}Cl_6$. The sample was poured in a 20 mL $ZrO_2$ milling jar which contained 30 g of diameter 5 mm $ZrO_2$ balls. The jar was equipped with a Viton seal and hermetically closed (Ar atmosphere inside the jar). The jar was removed from the glovebox and set inside a planetary ball-milling (Pulverisette 7 premium line, Fritsch). The mechanosynthesis was carried out at 600 rpm during 10 min for 155 cycles with a 10 min rest period between each cycle.

After the end of the mechanosynthesis the jar was entered in the glovebox. The grey powder obtained has been recovered and the XRD was in accordance with the reported pattern of the parent $Li_3YCl_6$. The white part of the powder was recovered separately and presented a large amount of precursors ($YCl_3$ and LiCl).

The transport properties of the grey powder have been measured after pelletizing:

Ionic conductivity measured at 20° C.: 0.31 mS/cm
Activation energy for lithium transport: 0.37 eV
Electronic conductivity at 20° C.: 2.3E-9 S/cm Example 4: $Li_3Y_{0.3}Er_{0.3}Yb_{0.3}Gd_{0.1}Cl_6$ by Dry Mechanochemistry The weighing of precursors and preparation of the sample was carried out in an Ar-filled glovebox with oxygen and moisture levels both below 1 ppm. In a typical experiment, a 30 mL glass vial has been used to weight LiCl (≥99.9%, Sigma Aldrich, 1.13 g), dry $YCl_3$ (≥99.9%, Sigma Aldrich, 1.92 g), dry $ErCl_3$ (≥99.9%, Sigma Aldrich, 1.92 g), ), dry $YbCl_3$ (≥99.9%, Sigma Aldrich, 1.92 g) and dry $GdCl_3$ (≥99%, Sigma Aldrich, 0.26 g) according to the target stoichiometry $Li_3Y_{0.3}Er_{0.3}Yb_{0.3}Gd_{0.1}Cl_6$. The sample was poured in a 20 mL $ZrO_2$ milling jar which contained 30 g of diameter 5 mm $ZrO_2$ balls. The jar was equipped with a Viton seal and hermetically closed (Ar atmosphere inside the jar). The jar was removed from the glovebox and set inside a planetary ball-milling (Pulverisette 7 premium line, Fritsch). The mechanosynthesis was carried out at 600 rpm during 10 min for 155 cycles with a 10 min rest period between each cycle.

After the end of the mechanosynthesis the jar was entered in the glovebox. The grey powder obtained has been recovered and the XRD was in accordance with the reported pattern of the parent $Li_3YCl_6$. The white part of the powder was recovered separately and presented a large amount of precursors ($YCl_3$, $ErCl_3$, $YbCl_3$ and LiCl).

The transport properties of the grey powder have been measured after pelletizing:

Ionic conductivity measured at 20° C.: 0.20 mS/cm
Activation energy for lithium transport: 0.40 eV
Electronic conductivity at 20° C.: 2.2E-9 S/cm Example 5: $Li_{2.7}YGd_{0.1}Cl_6$ by Dry Mechanochemistry The weighing of precursors and preparation of the sample was carried out in an Ar-filled glovebox with oxygen and moisture levels both below 1 ppm. In a typical experiment, a 30 mL glass vial has been used to weight LiCl (≥99.9%, Sigma Aldrich, 1.13 g), dry $YCl_3$ (≥99.9%, Sigma Aldrich, 1.92 g) and dry $GdCl_3$ (99%, Sigma Aldrich, 0.26 g) according to the target stoichiometry $Li_{2.7}YGd_{0.1}Cl_6$. The sample was poured in a 20 mL $ZrO_2$ milling jar which contained 30 g of diameter 5 mm $ZrO_2$ balls. The jar was equipped with a Viton seal and hermetically closed (Ar atmosphere inside the jar). The jar was removed from the glovebox and set inside a planetary ball-milling (Pulverisette 7 premium line, Fritsch). The mechanosynthesis was carried out at 600 rpm during 10 min for 155 cycles with a 10 min rest period between each cycle.

After the end of the mechanosynthesis the jar was entered in the glovebox. The grey powder obtained has been recovered and the XRD was in accordance with the reported pattern of the parent $Li_3YCl_6$. The white part of the powder was recovered separately and presented a large amount of precursors ($YCl_3$ and LiCl).

The transport properties of the grey powder have been measured after pelletizing:

Ionic conductivity measured at 20° C.: 0.44 mS/cm
Activation energy for lithium transport: 0.37 eV
Electronic conductivity at 20° C.: 9E-10 S/cm Example 6: $Li_3Y_{0.45}Er_{0.45}Gd_{0.1}Cl_6$ by Wet Mechanochemistry The weighing of precursors and preparation of the sample was carried out in an Ar-filled glovebox with oxygen and moisture levels both below 1 ppm. In a typical experiment, a 30 mL glass vial has been used to weight LiCl (≥99.9%, Sigma Aldrich, 3.78 g), dry $YCl_3$ (≥99.9%, Sigma Aldrich, 2.64 g) dry $ErCl_3$ (≥99.9%, Sigma Aldrich, 3.65 g) and dry $GdCl_3$ (≥99%, Sigma Aldrich, 0.77 g) according to the target stoichiometry $Li_3Y_{0.45}Er_{0.45}Gd_{0.1}Cl_6$. The sample was poured in a 45 mL $ZrO_2$ milling jar which contains 30 g of diameter 5 mm $ZrO_2$ balls. Then 10.65 g of p-xylene (≥99%, Sigma-Aldrich, anhydrous) was added in the jar. The jar was equipped with a Viton seal and hermetically closed (Ar atmosphere inside the jar). The jar was removed from the glovebox and set inside a planetary ball-milling (Pulverisette 7 premium line, Fritsch). The mechanosynthesis was carried out at 800 rpm during 165 cycles of 10 min with a 30 min rest period between each cycle. After the end of the mechanosynthesis the jar was entered in the glovebox. The product and the balls were set inside two 30 mL glass vials (without caps) placed themselves in a glass tube. The tube was closed, removed from the glovebox and set in a Glass Oven B-585 from Büchi. The sample was dried under vacuum for 2 h at room temperature to evaporate the p-xylene. The grey powder obtained has been recovered and the XRD was in accordance with the reported pattern of $Li_3YCl_6$.

The transport properties of the grey powder have been measured after pelletizing:

Ionic conductivity measured at 20° C.: 0.39 mS/cm
Activation energy for lithium transport: 0.35 eV
Electronic conductivity at 20° C.: 3E-9 S/cm

Example 7: Stability Measurements in Various Solvents

Stability was checked by weighting 100 mg of $Li_3YCl_6$ from example 1 into 2 g of the selected solvents for 7 days and filtered the solution. When a filter residue is present, it was dried with under vaccuum at 25° C. to test the conductivity.

| Solvent | Product conductivity at 20 °C (mS/cm) |
|---|---|
| Water | No |
| Acetonitrile | Below $10^{-7}$ |
| Ethanol | No |
| N-Methyl-2-pyrrolidone | No |
| Paraxylene | 0.18 |
| Perfluoropolyether (Galden HT-135) | 0.14 |
| Acetone | No |
| THF | No |

Filtrate was then analyzed by ICP-MS in case of paraxylene and less than 1 ppm of $Y^{3+}$ and $Li^+$ where found in the filtrate. Same was done on the starting agents LiCl and $YCl_3$ and no solubility was found (less of 1 ppm of $Y^{3+}$ and $Li^+$ in the filtrate).

It appears that these compounds are stable (by XRD and conductivity) in xylene and fluorosolvents (Galden HT-135).

Example 8: $Li_3YCl_6$ by Wet Mechanochemistry

The weighing of precursors and preparation of the sample was carried out in an Ar-filled glovebox with oxygen and moisture levels both below 1 ppm. In a typical experiment, a 30 mL glass vial has been used to weight LiCl (≥99.9%, Sigma Aldrich, 2.45 g) and dry $YCl_3$ (≥99%, Sigma Aldrich, 3.78 g) according to the target stoichiometry $Li_3YCl_6$. The sample was poured in a 45 mL $ZrO_2$ milling jar which contained 30 g of diameter 5 mm $ZrO_2$ balls. Then 6.05 g of p-xylene (≥99%, Sigma-Aldrich, anhydrous) was added in the jar.

The jar was equipped with a Viton seal and hermetically closed (Ar atmosphere inside the jar). The jar was removed from the glovebox and set inside a planetary ball-milling (Pulverisette 7 premium line, Fritsch). The mechanosynthesis was carried out at 800 rpm during 165 cycles of 10 min with a 30 min rest period between each cycle. After the end of the mechanosynthesis the jar was entered in the glovebox. The product and the balls were set inside two 30 mL glass vials (without caps) placed themselves in a glass tube. The tube was closed, removed from the glovebox and set in a Glass Oven B-585 from Buchi. The sample was dried under vacuum for 2 h at room temperature to evaporate the p-xylene. The grey powder obtained has been recovered and the XRD was in accordance with the reported pattern of $Li_3YCl_6$.

The transport properties of the grey powder have been measured after pelletizing:

Ionic conductivity measured at 20° C.: 0.14 mS/cm.
Activation energy for lithium transport: 0.38 eV
Electronic conductivity at 20° C.: 6E-10 S/cm

Example 9: $Li_3YCl_6$ with Water Mediated Synthesis $Li_3YCl_6$ has been produced by using a method described to produce $Li_3InCl_6$ in water mediated synthesis (Angewandte Chemie, 131(46), 16579-16584).

In a typical experiment, a 50 mL glass beaker was used to weight LiCi (≥99.9%, Sigma Aldrich, 1.90 g), and a aqueous solution of $YCl_3$ (>99%, 13.5 g with a Dry equivalent content of $YCl_3$ equal to 3.01 g) according to the target stoichiometry $Li_3YCl_6$.

The beaker was then placed into oven at 120° C. for water evaporation for 19 h. Final product was white glassy solid. This product was then vaccum dried at 120° C. during 4 h in Glass Oven B-585 from Buchi. XRD of this sample shown presence of LiCl, $LiCl(H_2O)$, $YCl_3$ and $YCl_3{\cdot}6H_2O$. There is no presence of an unknown phase, which can be attributed to a hydrated phase $Li_3YCl_6$, $xH_2O$, contrary to reported $Li_3InCl_6$, $xH_2O$).

The subsequent heating of the sample at 200° C. under vacuum (Glass Oven B-585 from Buchi) during 4 h lead to the formation of a mixture of LiCl and $YCl_3$. There is no presence of $Li_3YCl_6$, contrary to reported $Li_3InCl_6$.

Example 10: $Li_{2.6}Zr_{0.4}Y_{0.54}Sm_{0.06}Cl_{5.82}Br_{0.18}$ by Wet Mechanochemistry The weighting of precursors and preparation of the sample is carried out in an Ar-filled glovebox with oxygen and moisture levels both below 1 ppm. In a typical experiment, a 30 mL glass vial is used to weight LiCl (≥99.9%, Sigma Aldrich, 1.65 g), dry $YCl_3$ (≥99.9%, Sigma Aldrich, 1.59 g), dry $ZrCl_4$ ((≥99.9%, Sigma Aldrich, 1.43 g) and dry $SmBr_3$ (≥99%, Sigma Aldrich, 0.35 g) according to the target stoichiometry $Li_{2.6}Zr_{0.4}Y_{0.54}Sm_{0.06}Cl_{5.82}Br_{0.18}$.

The sample is poured in a 45 mL $ZrO_2$ milling jar which contains 66 g of Ø5 mm $ZrO_2$ balls. Then 5.0 g of p-xylene (≥99%, Sigma-Aldrich, anhydrous) is added in the jar.

The jar is equipped with a Viton seal and hermetically closed (Ar atmosphere inside the jar). The jar is removed from the glovebox and set inside a planetary ball-milling (Pulverisette 7 premium line, Fritsch). The mechanosynthesis is carried out at 800 rpm during 165 cycles of 10 minutes with a 15 minutes rest period between each cycle.

After the end of the mechanosynthesis the jar is entered in the glovebox. The product and the balls are set inside two 30 mL glass vials (without caps) placed themselves in a glass tube. The tube is closed, removed from the glovebox and set in a Glass Oven B-585 from Buchi.

The sample is dried under vacuum at 110° C. for 5 h to evaporate the p-xylene. The powder obtained is recovered and the XRD is in accordance with the reported pattern of $Li_3YCl_6$ The ionic conductivity measured at 30° C. is 0.57 mS/cm with an activation energy of 0.35 eV.

TABLE 1

| Conductivities at 20 °C and at lower temperature | | | |
|---|---|---|---|
| | 20 °C | 0 °C | −20 °C |
| Example 1 ($Li_3YCl_6$ dry mechanochemistry) | 0.16 mS/cm | 0.038 mS/cm | 0.013 mS/cm |
| Example 9 ($Li_3YCl_6$ wet mechanochemistry) | 0.14 mS/cm | 0.046 mS/cm | 0.016 mS/cm |
| Example 6 ($Li_3Y_{0.45}Er_{0.45}Gd_{0.1}Cl_6$ wet mechanochemistry) | 0.39 mS/cm | 0.13 mS/cm | 0.16 mS/cm |

The results compiled in Table 1, show that the solid lithium rare-earth halides obtained by the wet mechanochemistry process according to the invention have surprisingly improved ionic conductivities at low temperature compared to solid lithium rare-earth halides obtained by the dry mechanochemistry process (compare example 9 with example 1 at 0° C. and −20° C.).

The invention claimed is:

1. A solid material according to general formula (I) as follows:

$$Li_{6-3x-4y}RE_xT_yX_6 \quad (I)$$

wherein:

X is a halogen;

$0<x+(4/3)\,y<2$;

$0\leq y\leq 0.8$;

RE denotes two or more rare-earth metals; the rare-earth metals are different from each other; and T is Zr or Hf;

with the proviso that when y=0 and RE denotes two rare-earth metals then when one rare earth metal is Y, the other one is selected from the group consisting of Gd, Yb, Ho, Er, Dy, Ce, Tb and Nd, wherein the solid material comprises a fraction consisting of glass phases.

2. The solid material according to claim 1, wherein the solid material is any one of the compounds of formulas (II) to (V) as follows:

$$Li_{6-3x-4y}RE1_aRE2_bT_yX_6 \quad (II)$$

wherein a+b=x, with $0.05\leq a\leq 0.95$ and $0.0<b\leq 0.95$; and when y=0 and RE1 is Y, RE2 is selected from the group consisting of Gd, Yb, Ho, Er, Dy, Ce, Tb and Nd;

$$Li_{6-3x-4y}RE1_aRE2_bRE3_cT_yX_6 \quad (III)$$

wherein a+b+c=x, with $0.05\leq a\leq 0.95$, $0.0<b\leq 0.95$ and $0.0<c\leq 0.95$ with $0.05\leq b+c$;

$$Li_{6-3x-4y}RE1_aRE2_bRE3_cRE4_dT_yX_6 \quad (IV)$$

wherein a+b+c+d=x, with $0.05\leq a\leq 0.95$, $0.0<b\leq 0.95$, $0.0<c\leq 0.95$ and $0.0<d\leq 0.95$ with $0.05\leq b+c+d$;

$$Li_{6-3x-4y}RE1_aRE2_bRE3_cRE4_dRE5_eT_yX_6 \quad (V)$$

wherein a+b+c+d+e=x, with $0.05\leq a\leq 0.95$, $0.0<b\leq 0.95$, $0.0<c\leq 0.95$, $0.0<d\leq 0.95$ and $0.0<e\leq 0.95$, with $0.05\leq b+c+d+e$; and X is a halogen;

$0<x+(4/3)y<2$;

$0\leq y\leq 0.8$;

RE1 is selected from the group consisting of: Y, Yb, Ho, and Er;

RE2 is selected from the group consisting of: Yb, Ho, Gd, Er, Sm, Dy, La, Nd, Ce, and Tb;

RE3 is selected from the group consisting of: Ho, Gd, Er, Sm, Dy La, Nd, Ce, and Tb;

RE4 is selected from the group consisting of: Er, Gd Sm, Dy La, Nd, Ce, and Tb; and RE5 is selected from the group consisting of: Gd Sm, Dy La, Nd, Ce, and Tb; where RE1, RE2, R3, R4 and RE5 are different; and T is Zr or Hf.

3. The solid material according to claim 1, wherein the mean ionic radius of RE exhibits an ionic radius value (in Å) lower than 0.938 Å.

4. The solid material according to claim 1, wherein y=0.

5. The solid material according to claim 1, wherein the solid material is selected from the group consisting of $Li_3Y_{0.9}Gd_{0.1}Cl_6$; $Li_3Y_{0.3}Er_{0.3}Yb_{0.3}Gd_{0.1}Cl_6$, $Li_{2.7}Y_1Gd_{0.1}Cl_6$; $Li_3Y_{0.5}Er_{0.5}Cl_6$; $Li_3Y_{0.45}Er_{0.45}Gd_{0.1}Cl_6$; and $Li_3Y_{0.45}Er_{0.45}La_{0.1}Cl_6$.

6. The solid material according to claim 1, wherein the solid material is in powder form with a distribution of particle diameters having a D50 comprised between 0.05 µm and 10 µm.

7. A process for the preparation of a solid material according to claim 1, comprising the steps of:

a) obtaining a composition by admixing stoichiometric amounts of a lithium halide, at least two different rare-earth metal halides, wherein the halides of the rare-earth metal are different from each other, and optionally zirconium or hafnium halide, optionally in one or more solvents, under an inert atmosphere;

b) applying a mechanical treatment to the composition obtained in step a) in order to obtain the solid material; and c) optionally removing at least a portion of the one or more solvents from the composition obtained on step b), to obtain the solid material.

8. The process according to claim 7, wherein the zirconium halide is $ZrCl_4$.

9. The process according to claim 7, wherein the solvents are chosen from the group consisting of aliphatic hydrocarbons, and aromatic hydrocarbons.

10. A solid material obtained by the process according to claim 7.

11. A method comprising incorporating the solid material according to claim 1 into a solid electrolyte.

12. A solid electrolyte comprising a solid material according to claim 1.

13. An electrochemical device comprising a solid electrolyte comprising a solid material according to claim 1.

14. A solid state battery comprising a solid electrolyte comprising a solid material according to claim 1.

15. A vehicle comprising a solid state battery comprising a solid electrolyte comprising a solid material according to claim 1.

16. An electrode comprising:

a metal substrate;

directly adhered onto said metal substrate, at least one layer made of a composition comprising:

(i) a solid material according to claim 1;

(ii) an electro-active compound (EAC);

(iii) optionally, a lithium ion-conducting material (LiCM) other than the solid material;

(iv) optionally, an electro-conductive material (ECM);

(v) optionally, a lithium salt (LIS); and (vi) optionally, a polymeric binding material (P).

17. A separator comprising:

a solid material according to claim 1;

optionally, a polymeric binding material (P);

optionally, a metal salt; and optionally, a plasticizer.

18. A process for the preparation of a solid material according to general formula (I) as follows:

$$Li_{6-3x-4y}RE_xT_yX_6 \quad (I)$$

wherein:

X is a halogen;

$0<x+(4/3)y<2$;

$0 \leq y \leq 0.8$;

RE denotes one or more rare-earth metals; the rare-earth metals are different from each other;

T is Zr or Hf; and wherein the solid material comprises a fraction consisting of glass phases;

said process comprising the steps of:

a) obtaining a composition by admixing stoichiometric amounts of a lithium halide, at least one rare-earth metal halide and optionally zirconium or hafnium halide, in one or more solvents, under an inert atmosphere;

b) applying a mechanical treatment to the composition obtained in step a) in order to obtain the solid material; and c) removing at least a portion of the one or more solvents from the composition obtained on step b), to obtain the solid material.

19. The process according to claim 18, wherein the solid material is any one of the compounds of formulas (II) to (V) as follows:

$$Li_{6-3x-4y}RE1_aRE2_bT_yX_6 \quad (II)$$

wherein $a+b=x$, with $0.05 \leq a \leq 0.95$ and $0.0<b \leq 0.95$;

$$Li_{6-3x-4y}RE1_aRE2_bRE3_cT_yX_6 \quad (III)$$

wherein $a+b+c=x$, with $0.05 \leq a \leq 0.95$, $0.0<b \leq 0.95$ and $0.0<c \leq 0.95$ with $0.05 \leq b+c$;

$$Li_{6-3x-4y}RE1_aRE2_bRE3_cRE4_dT_yX_6 \quad (IV)$$

wherein $a+b+c+d=x$, with $0.05 \leq a \leq 0.95$, $0.0<b \leq 0.95$, $0.0<c \leq 0.95$ and $0.0<d \leq 0.95$ with $0.05 \leq b+c+d$;

$$Li_{6-3x-4y}RE1_aRE2_bRE3_cRE4_dRE5_eT_yX_6 \quad (V)$$

wherein $a+b+c+d+e=x$, with $0.05 \leq a \leq 0.95$, $0.0<b \leq 0.95$, $0.0<c \leq 0.95$, $0.0<d \leq 0.95$ and $0.0<e \leq 0.95$, with $0.05 \leq b+c+d+e$; and wherein X is a halogen, $0<x+(4/3)y<2$;

$0 \leq y \leq 0.8$;

RE1 is selected from the group consisting of: Y, Yb, Ho, and Er;

RE2 is selected from the group consisting of: Yb, Ho, Gd, Er, Sm, Dy, La, Nd, Ce, and Tb;

RE3 is selected from the group consisting of: Ho, Gd, Er, Sm, Dy La, Nd, Ce, and Tb;

RE4 is selected from the group consisting of: Er, Gd Sm, Dy La, Nd, Ce, and Tb; and RE5 is selected from the group consisting of: Gd Sm, Dy La, Nd, Ce, and Tb; where RE1, RE2, RE3, RE4 and RE5 are different; and T is Zr or Hf.

* * * * *